United States Patent [19]

Ohta

[11] Patent Number: 5,420,695
[45] Date of Patent: May 30, 1995

[54] IMAGE READING AND FORMING APPARATUS FOR IDENTIFYING AND CORRECTING THE GRIDLINES OF A TABLE

[75] Inventor: Junichi Ohta, Yokohama, Japan

[73] Assignee: Ricoh Company, Ltd., Tokyo, Japan

[21] Appl. No.: 27,240

[22] Filed: Mar. 5, 1993

[30] Foreign Application Priority Data

Mar. 5, 1992 [JP] Japan .................. 4-048700

[51] Int. Cl.⁶ .................. H04N 1/387; G06K 9/42
[52] U.S. Cl. .................. 358/462; 358/401; 358/449; 358/452; 382/298; 395/146; 395/149
[58] Field of Search ............ 358/400, 401, 432, 449, 358/461, 462, 451, 452, 453; 382/47, 9; 395/146, 149

[56] References Cited

U.S. PATENT DOCUMENTS

| | | | |
|---|---|---|---|
| 4,903,141 | 2/1990 | Morton et al. | 358/461 |
| 4,951,158 | 8/1990 | Ichitani | 358/451 |
| 5,040,078 | 8/1991 | Yahara | 358/449 |
| 5,048,107 | 9/1991 | Tachikawa | 382/9 |
| 5,053,885 | 10/1991 | Telle | 358/449 |
| 5,070,412 | 12/1991 | Kumamoto et al. | 358/449 |
| 5,075,895 | 12/1991 | Bessho | 382/61 |
| 5,097,519 | 3/1992 | Sugiura | 358/451 |
| 5,119,437 | 6/1992 | Kuwamura et al. | 358/453 |
| 5,124,799 | 6/1992 | Tsuboi et al. | 358/401 |
| 5,144,452 | 9/1992 | Abuyama | 358/401 |
| 5,148,295 | 9/1992 | Matsubara | 358/449 |
| 5,191,612 | 3/1993 | Katsuyama et al. | 358/462 |
| 5,198,853 | 3/1993 | Ichihara et al. | 358/449 |
| 5,239,287 | 8/1993 | Siio et al. | 340/706 |

OTHER PUBLICATIONS

"Excel 4 for Windows Made Easy":Copyright © 1992 by Martin s. Matthews and Carole Boggs Matthews, Chapters 2,4,5,6 & 12.

Primary Examiner—Edward L. Coles, Sr.
Assistant Examiner—Kimberly A. Williams
Attorney, Agent, or Firm—Oblon, Spivak, McClelland, Maier & Neustadt

[57] ABSTRACT

An image forming apparatus has an image reading and correcting device capable of reading a document including a table, identifying the table (guideline) from the document correcting the table, and then outputting an image with the corrected table. The apparatus can form corrected images in a table included in a document image, change the magnification ratio of the corrected table to the proper size and select the proper paper size for output.

22 Claims, 33 Drawing Sheets

|  |  | 1990 | |
|---|---|---|---|
|  |  | 1ST HALF | 2ND HALF |
| TOKYO AREA | PRODUCT A | 1,000,000 | 1,200,000 |
|  | PRODUCT B | 500,000 | 800,000 |
|  | TOTAL | 1,500,000 | 2,000,000 |

FIG. 8

| | | 1990 | | | | | |
|---|---|---|---|---|---|---|---|
| | | 1ST HALF | 2ND HALF | | | | |
| TOKYO AREA | PRODUCT A | 1,000,000 | 1,200,000 | | | | |
| | PRODUCT B | 500,000 | 800,000 | | | | |
| | TOTAL | 1,500,000 | 2,000,000 | | | | |
| | | | | | | | |

|  | 1990 1ST HALF | 1990 2ND HALF |
|---|---|---|
| PRODUCT A | 1,000,000 | 1,200,000 |
| PRODUCT B | 500,000 | 800,000 |
| TOTAL | 1,500,000 | 2,000,000 |

FIG. 14

| | 1990 1ST HALF | 1990 2ND HALF | | | | |
|---|---|---|---|---|---|---|
| PRODUCT A | 1,000,000 | 1,200,000 | | | | |
| PRODUCT B | 500,000 | 800,000 | | | | |
| TOTAL | 1,500,000 | 2,000,000 | | | | |
| | | | | | | |

FIG. 16

| | 1990 | |
|---|---|---|
| | JANUARY | FEBRUARY |
| TOKYO HEAD | 1,000,000 | 1,200,000 |
| YOKOHAMA BRANCH | 500,000 | 800,000 |
| CHIBA BRANCH | 700,000 | 400,000 |

(TOKYO AREA spans TOKYO HEAD, YOKOHAMA BRANCH, CHIBA BRANCH)

FIG.19

| | | 1990 | |
|---|---|---|---|
| | | JANUARY | FEBRUARY |
| TOKYO AREA | TOKYO HEAD | 1,000,000 | 1,200,000 |
| | YOKOHAMA BRANCH | 500,000 | 800,000 |
| | CHIBA BRANCH | 700,000 | 400,000 |
| | | | |

FIG. 21

| | PRICE | PROCESSING SPEED | MEMORY |
|---|---|---|---|
| PRODUCT A | 2,000 | 12 | 12 |
| PRODUCT B | 1,500 | 8 | 8 |
| PRODUCT C | 1,100 | 10 | 4 |

FIG. 27

| TOKYO AREA | | 1990 | |
|---|---|---|---|
| | | 1ST HALF | 2ND HALF |
| | PRODUCT A | 1,000,000 | 1,200,000 |
| | PRODUCT B | 500,000 | 800,000 |
| | TOTAL | 1,500,000 | 2,000,000 |

FIG. 28

| | | 1990 | | | | | | |
|---|---|---|---|---|---|---|---|---|
| | | 1ST HALF | 2ND HALF | | | | | |
| TOKYO AREA | PRODUCT A | 1,000,000 | 1,200,000 | | | | | |
| | PRODUCT B | 500,000 | 800,000 | | | | | |
| | TOTAL | 1,500,000 | 2,000,000 | | | | | |

FIG. 29

| | | 1990 | | | | | | |
|---|---|---|---|---|---|---|---|---|
| | | 1ST HALF | 2ND HALF | | | | | |
| TOKYO AREA | PRODUCT A | 1,000,000 | 1,200,000 | | | | | |
| | PRODUCT B | 500,000 | 800,000 | | | | | |
| | TOTAL | 1,500,000 | 2,000,000 | | | | | |

*FIG. 34*

| | | 1990 | | | | | |
|---|---|---|---|---|---|---|---|
| | | 1ST HALF | 2ND HALF | | | | |
| TOKYO AREA | PRODUCT A | 1,000,000 | 1,200,000 | | | | |
| | PRODUCT B | 500,000 | 800,000 | | | | |
| | TOTAL | 1,500,000 | 2,000,000 | | | | |

IMAGE READING AND FORMING APPARATUS FOR IDENTIFYING AND CORRECTING THE GRIDLINES OF A TABLE

BACKGROUND OF THE INVENTION

The present invention relates to an image forming apparatus, e.g., a digital copier, facsimile transceiver or word processor and, more particularly, to an image forming apparatus which has an image reading and correcting device capable of outputting an image with a corrected table and can form a corrected image on a paper sheet or similar recording medium.

A conventional digital copier, for example, scans or optically reads a document laid on a glass platen and causes a photoelectric transducer to convert it to an electric signal. The electric signal is subjected to various kinds of image processing to turn out a recording signal. The recording signal modulates the emission intensity or the emission time of a laser or similar light emitting device. As a result, a latent image corresponding to the document image is electrostatically formed on a photoconductive element. With such a digital copier, it is not practicable to add, delete or correct part of the document image, e.g., a table since the copier reads the document image uniformly. The only measure left is to cut and paste part of the document where the table exists or to erase or correct desired part of the table by a retouching liquid.

A computer system or a word processor equipped with a scanner and a printer can generate a table and correct it. However, although the system can easily and rapidly correct a table which it generated, it cannot do so when it comes to a table generated by another equipment. Hence, such a system cannot add a table unless newly generating it.

As stated above, conventional image forming apparatuses cannot correct part of a table included in a document image unless the table is cut and pasted at the cost of time. In addition, the table cut and pasted prevents an attractive image from being reproduced. Moreover, even with a word processor, for example, entering a table on a keyboard again is timer and labor-consuming.

SUMMARY OF THE INVENTION

It is, therefore, an object of the present invention to provide an image forming apparatus which includes an image reading and correcting device capable of reading a document with a table, correcting the table, and then outputting the resulting image, and which can form an image with a corrected table.

In accordance with the present invention, an image reading and correcting device comprises image reading means for optically reading a document to convert the document to bilevel image data by photoelectric conversion, first storing means for storing the image data from the image reading means, second storing means for storing image data produced by processing the image data stored in the first storing means, outputting means for outputting the image data stored in the second storing means, gridline identifying means for identifying an image representative of gridlines of a table out of the image data stored in the first storing means, row/column distance calculating means for calculating the height of, among rectangular cells constituting the table, the lowermost leftmost rectangular cell and the width of the uppermost rightmost rectangular cell as, respectively, a row distance and a column distance to be added or deleted, gridline correcting means for producing area data to be added or deleted on the basis of the row distance and column distance, and image generating means for generating an image with corrected gridlines by correcting the gridlines of the image data on the basis of the area data.

Also, in accordance with the present invention, in an image forming apparatus of the type having an image reading and correcting device comprising image reading means for optically reading a document to convert it to bilevel image data by photoelectric conversion, first storing means for storing the image data from the image reading means, second storing means for storing image data produced by processing the image data stored in the first storing means, outputting means for outputting the image data stored in the second storing means, gridline identifying means for identifying an image representative of gridlines of a table out of the image data stored in the first storing means, row/column distance calculating means for calculating the height of, among rectangular cells constituting the table, the lowermost leftmost rectangular cell and the width of the uppermost rightmost rectangular cell as, respectively, a row distance and a column distance to be added or deleted, gridline correcting means for producing area data to be added or deleted on the basis of the row distance and column distance, and image generating means for generating an image with corrected gridlines by correcting the gridlines of the image data on the basis of the area data, there are provided paper selecting means for allowing an operator to select a desired paper size, displaying means for displaying a message, image forming means for forming an image on a recording medium implemented as a paper sheet in response to an image signal, and control means for controlling the paper selecting means, displaying means, and image forming means. The control means displays an alert message on the displaying means when a table corrected on the basis of the area data from the gridline correcting means will exceed an image forming area of the paper sheet of the size selected on the paper selecting means.

Further, in accordance with the present invention, in an image forming apparatus of the type described, there are provided automatic paper selecting means for automatically selecting a paper size in response to size selection data, image forming means for forming an image on a recording medium implemented as a paper sheet in response to an image signal, and control means for controlling the automatic paper selecting means and image forming means. The control means selects, when a table corrected on the basis of the area data from the gridline correcting means exceeds an image forming area of a paper sheet selected, an adequate number of paper sheets having a particular size and sends the resulting size selection data to the automatic paper selecting means.

In addition, in accordance with the present invention, in an image forming apparatus of the type described, there are provided image forming means for forming an image on a recording medium implemented as a paper sheet in response to an image signal, first magnification changing means for generating image data by changing a size of the bilevel image data produced by the image reading means and storing the image data in the first storing means, and magnification change ratio calculating means for determining, when a table corrected on the basis of the area data from the gridline correcting means will exceed an image forming area of a paper sheet selected, a magnification change ratio of the table corrected to equalize the table to the table of the document in size and then delivering magnification change ratio data.

BRIEF DESCRIPTION OF THE DRAWINGS

The above and other objects, features and advantages of the present invention will become more apparent from the following detailed description taken with the accompanying drawings in which:

FIG. 8 shows a table corrected by the embodiment;

FIG. 14 shows a specific table image corrected by the second embodiment;

FIG. 16 shows another specific document including a table;

FIG. 19 shows a table image processed by the third embodiment;

FIG. 21 shows another specific document image including a table;

FIG. 27 shows another specific document image including a table;

FIG. 28 shows a table image being processed by gridline correcting means;

FIGS. 29–32 are block diagrams schematically showing respectively a seventh, an eighth, a ninth and a tenth embodiment of the present invention;

FIG. 34 shows a table image processed by the tenth embodiment;

DESCRIPTION OF THE PREFERRED EMBODIMENTS

Figure 1:
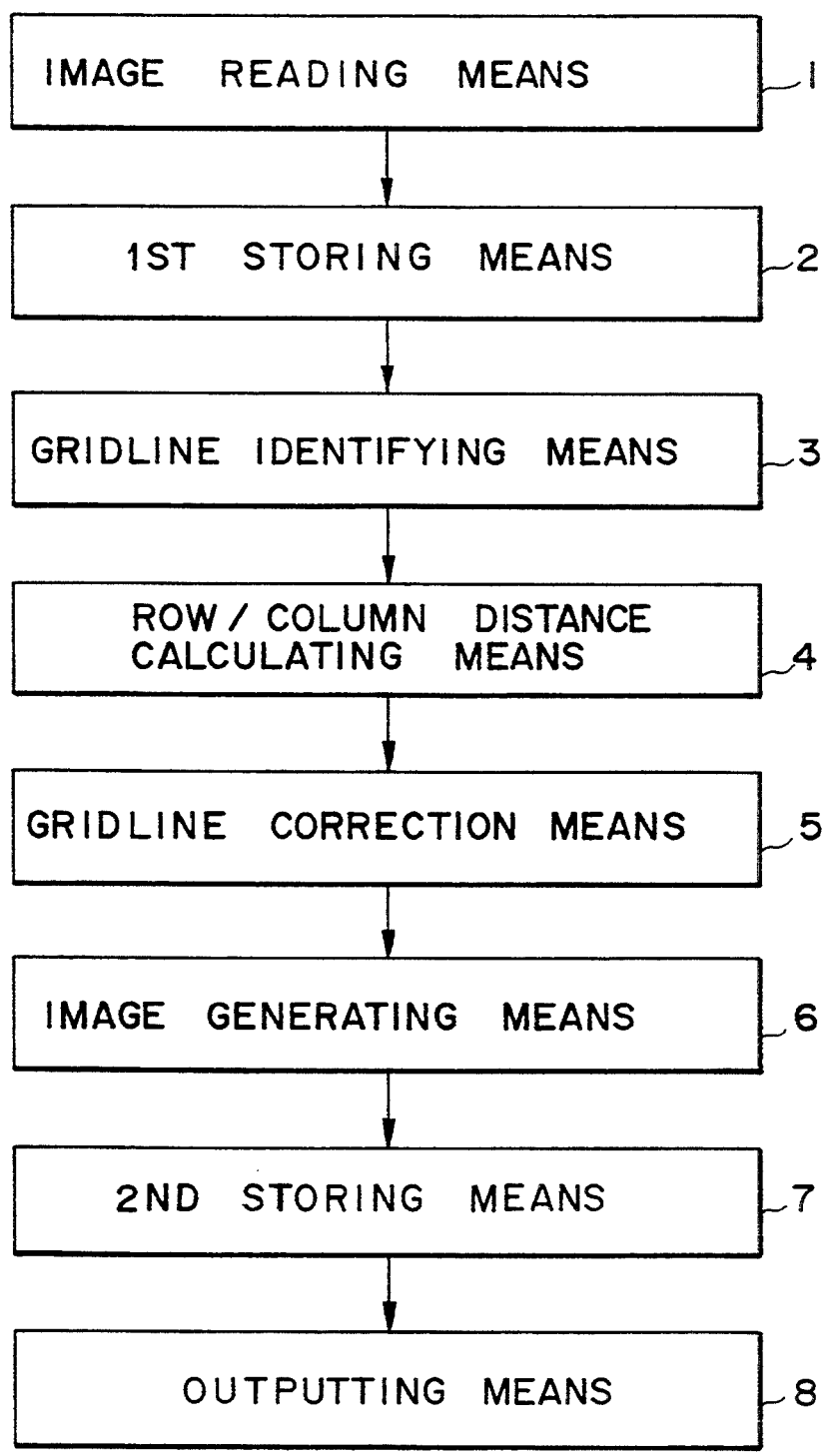
FIG. 1 is a block diagram schematically showing a first embodiment of the image reading and correcting device in accordance with the present invention.
Figure 2A:
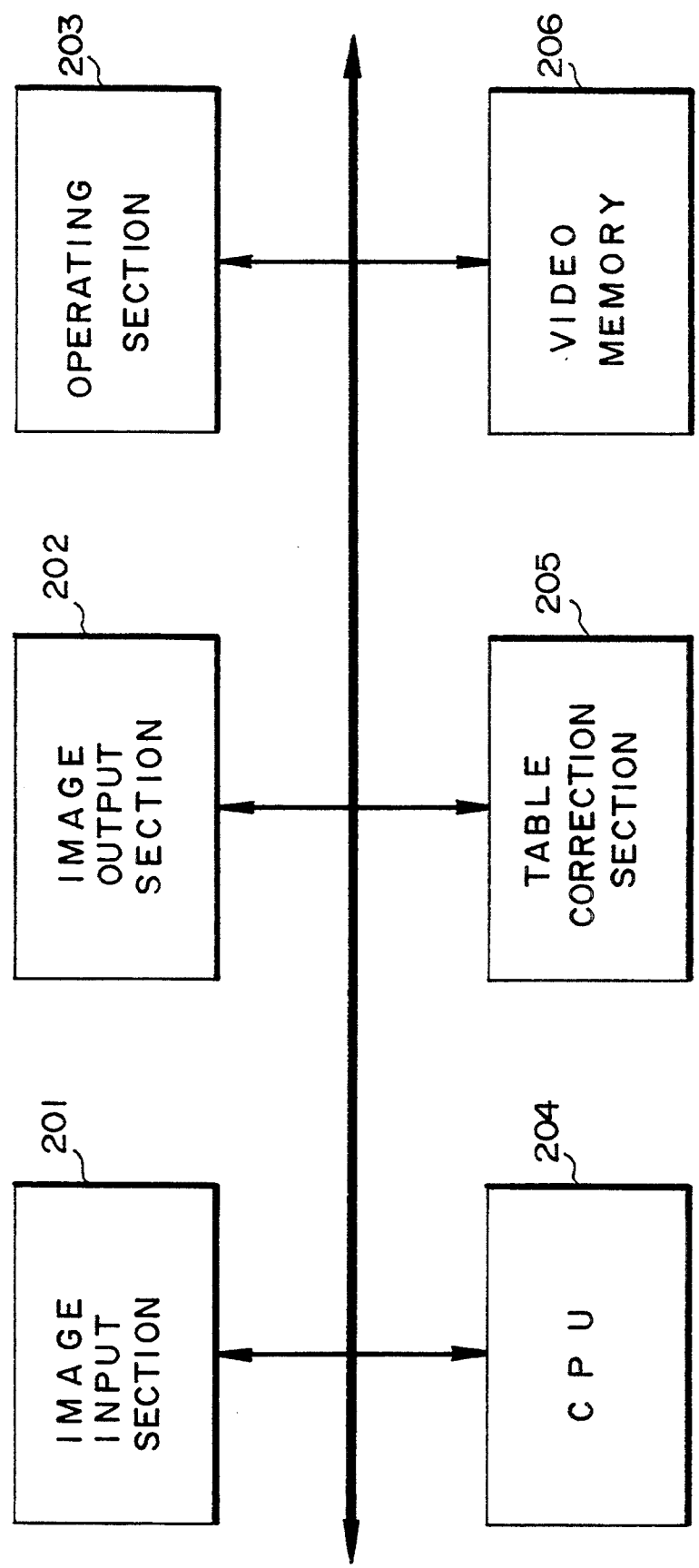
FIG. 2A is a block diagram schematically showing the first embodiment more specifically.
Figure 2B:
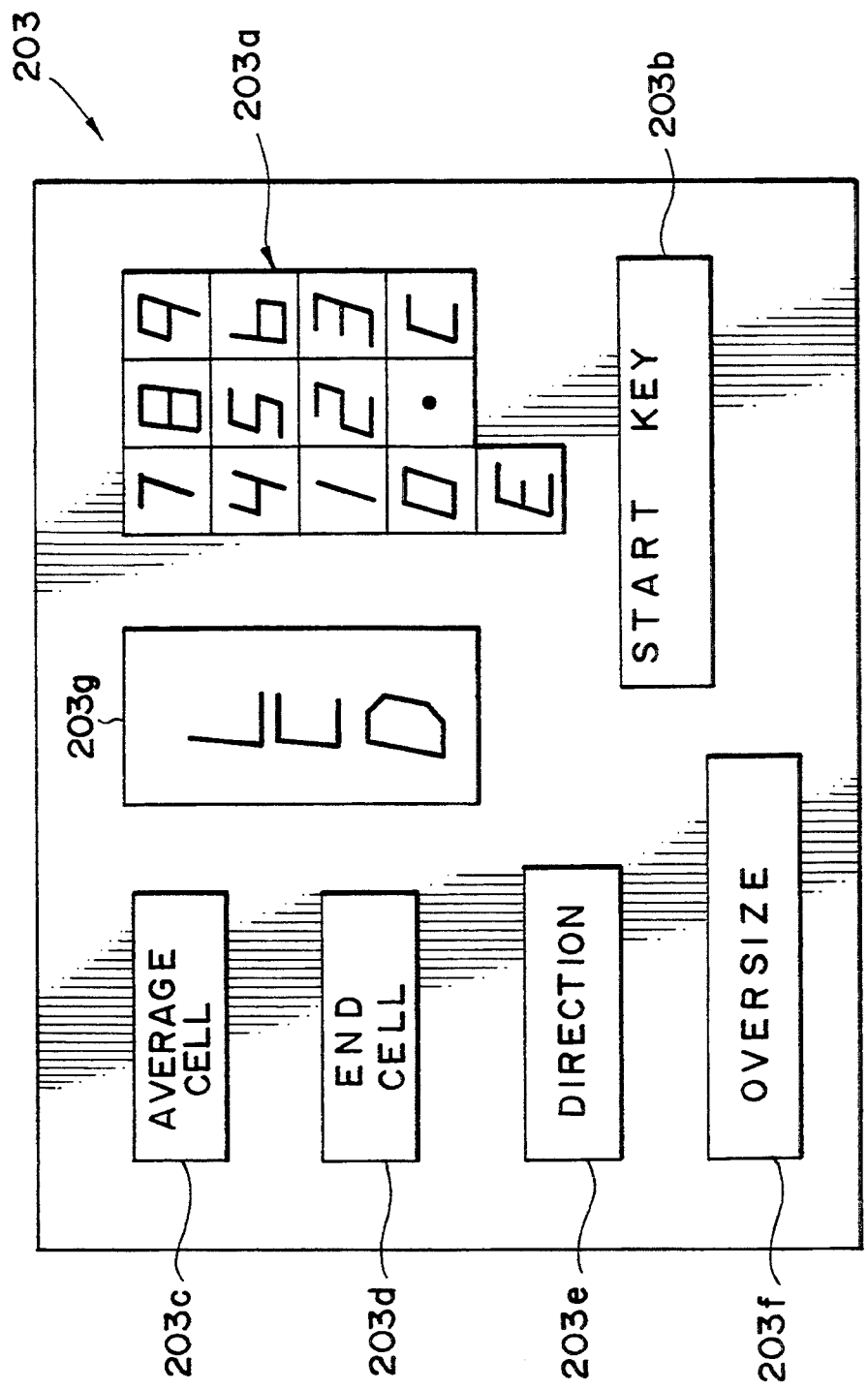
FIG. 2B shows a specific arrangement of an operating section included in the block diagram of FIG. 2A.

Referring to FIG. 1, the general arrangement of an image reading and correcting device embodying the present invention is shown. As shown, the device is made up of image reading means 1, first storing means 2, gridline identifying means 3, row/column distance calculating means 4, gridline correcting means 5, image generating means 6, second storing means 7, and outputting means 8. FIG. 2A shows functional blocks constituting the device shown in FIG. 1. There are shown in FIG. 1 an image input section 201 for reading an image, an image output section 202 for outputting the image, an operating section 203 for allowing the operator to input desired data and commands and showing messages meant for the operator, a CPU (Central Processing Unit) 204 for controlling the entire device, a table correcting section 205 for identifying a table included in a document image and correcting it in a predetermined manner, and a video memory 206 for storing an input image and an output image. FIG. 2B shows a specific arrangement of the operating section 203. As shown, the operating section 203 is provided with numeral keys 203a for entering a desired number of copies and other numerical data, a start key 203b for commanding a start of copying operation, an average cell key 203c, an end cell key 203d, a direction key 203e, an oversize key 203f, and a liquid crystal display (LCD) 203g.

To correct a table, the operator presses the direction key 203e to select either of the direction of rows (vertical direction) and the direction of columns (horizontal direction). On the turn-on of the direction key 203e, a message "DIRECTION OF ROWS" appears on the LCD 203g. As the operator presses an enter key (E) associated with the numeral keys 203a, the direction of rows is entered. When the operator presses the direction key 203e again, a message "DIRECTION OF COLUMNS" appears on the LCD 203g. Then, as the operator presses the enter key E, the direction of columns is entered. Subsequently, when the operator manipulates the numeral keys 203a to enter a desired numerical value, the width of a cell to be entered is set on a millimeter basis. On the other hand, when the operator presses the average cell key 203c after the direction key 203e, it is commanded that the average width of the cells of the document image in the direction selected on the direction key 203e be the width of a cell to be added. Further, as the operator presses the end cell key 203d after the direction key 203e, it is commanded that the width of the end cell in the direction selected (bottom cell in the direction of rows or rightmost cell in the direction of columns) be the width of a cell to be added. Assume that the additional cell will cause part of the resulting cells to exceed the size of a paper sheet or similar recording medium. Then, an alert message appears on the LCD 203g, or the operator is urged to press the oversize key 203f to reduce the entire table. After all the necessary keys have been pressed, the start key 203b will be pressed to execute image processing (copying) on the basis of the entered data.

Figures 3, 4:
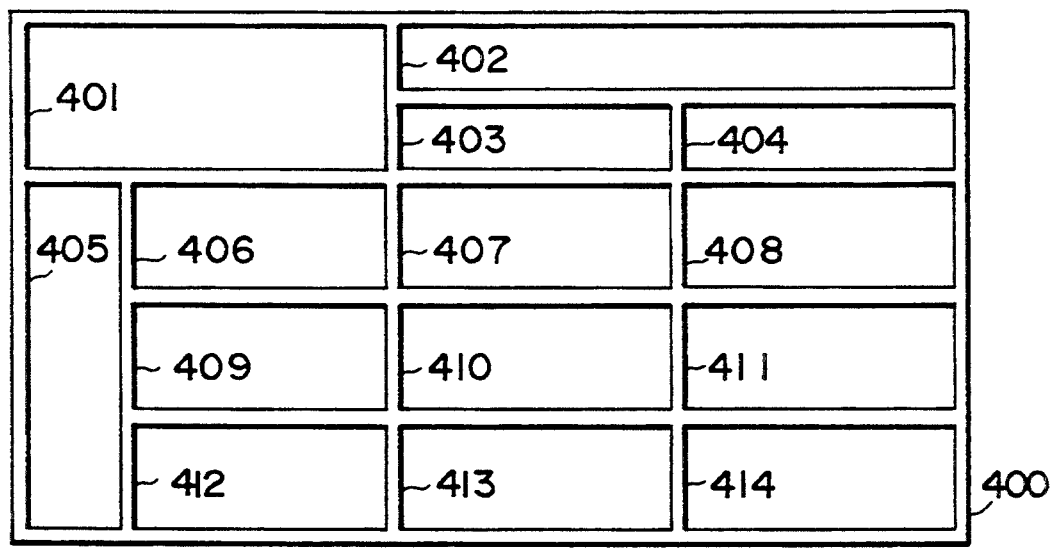
FIG. 3 shows a specific document image including a table.
FIG. 4 shows contour loops separated by gridline identifying means.

FIG. 3 shows a specific document including a table. How the embodiment corrects the table of FIG. 3 will be described with reference also made to FIG. 1. To begin with, the image reading means 1 reads the document image and stores it in the first storing means 2 in the form of bilevel digital data. The gridline identifying means 3 sequentially traces the contours, i.e., the boundaries between black pixels and white pixels of the image represented by the image data stored in the storing means 2, thereby producing contour loops. Subsequently, the gridline identifying means 3 separates contour loops constituting the gridlines of the table on the basis of the sizes of the contour loops and the relation between outer and inner contour loops. FIG. 4 shows the contour loops produced by such a procedure. As shown, the table has an outer contour loop 400, and inner contour loops 401–414 contained in the outer contour loop 400.

Figure 5:
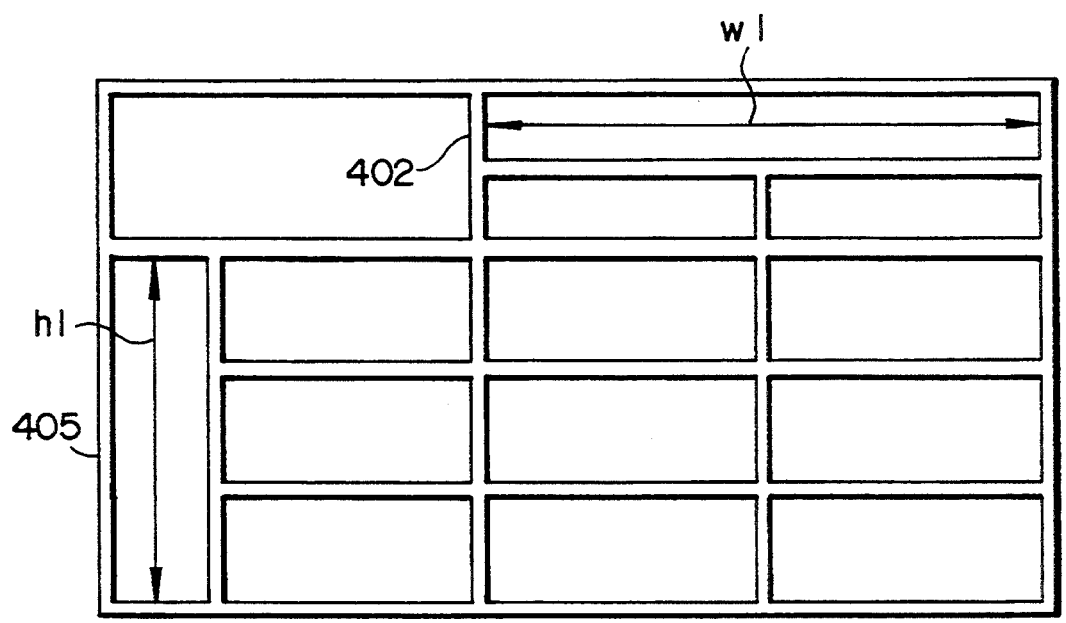
FIG. 5 shows how row/column distance calculating means calculates distances.

As shown in FIG. 5, the row/column distance calculating means 4 calculates the height h1 of, among the inner contour loops, the loop 405 located at the lowermost leftmost position as an add or delete distance in the direction of rows. At the same time, this means 4 calculates the width w1 of the inner contour loop 402 located at the uppermost rightmost position as an add or delete distance in the direction of columns. Subsequently, the gridline correcting means 5 calculates an area to be added or deleted in the direction of rows and an area in the direction of columns on the basis of the distances determined by the calculating means 4. The image generating means 6 produces an image with corrected gridlines on the basis of the area determined by the correcting means 5 and then stores the image in the second storing means 7.

Figure 6:
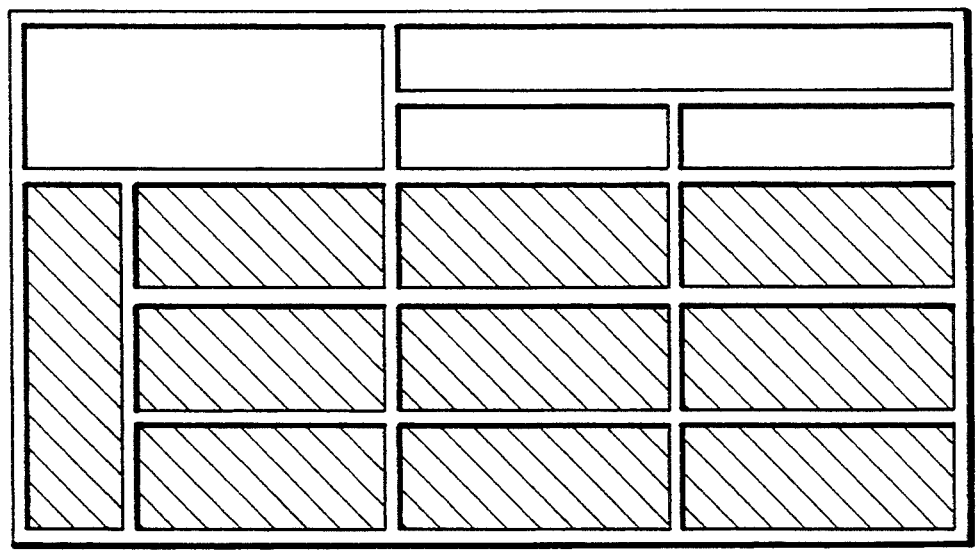
FIG. 6 shows an area to be processed by gridline correcting means in the direction of rows.
Figure 7:
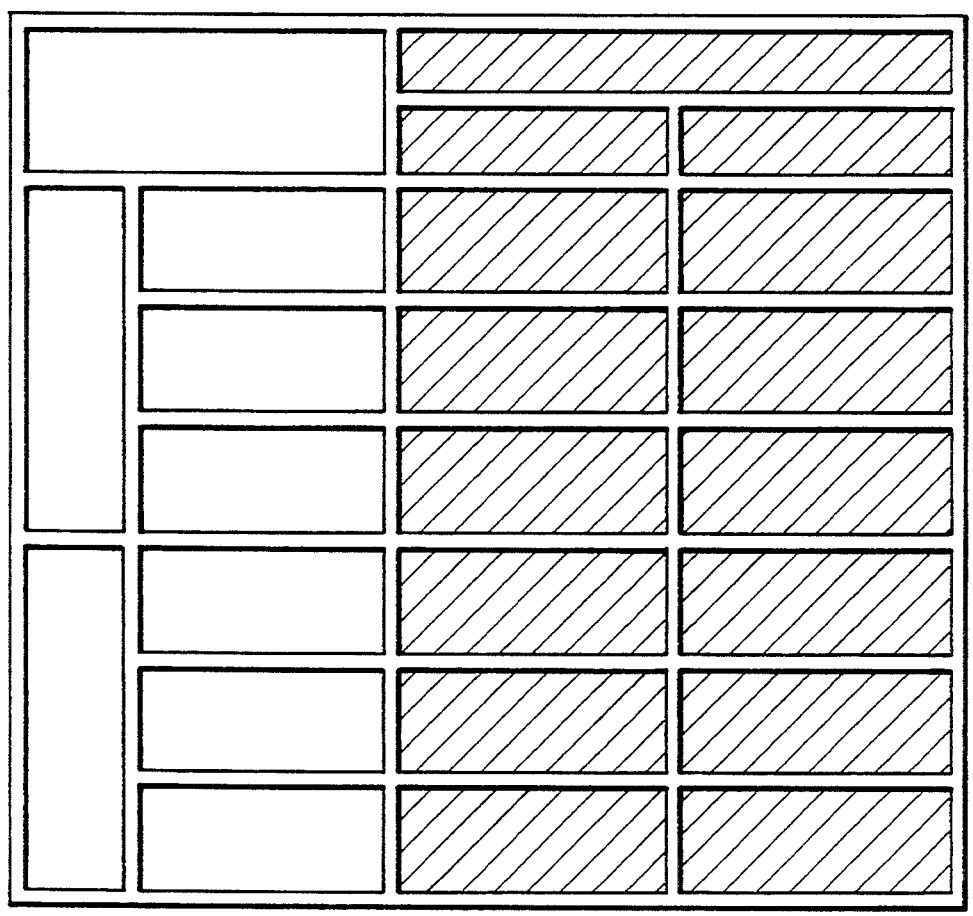
FIG. 7 shows an area to be processed by the gridline correcting means in the direction of columns.

FIG. 6 indicates by hatching the area to be added or deleted in the direction of rows as determined by the gridline correcting means 5. In the case of addition, the area indicated by hatching in FIG. 6 is added to the bottom of the table, as viewed in the figure. Next, as indicated by hatching in FIG. 7, the area to be added or deleted in the direction of columns is copied at the right end of the table. As a result, image data representative of an image shown in FIG. 8 is stored in the second storing means 7. Finally, the outputting means 8 outputs the image data stored in the storing means 7 to form the corresponding image on a paper sheet or similar recording medium.

Figure 9:
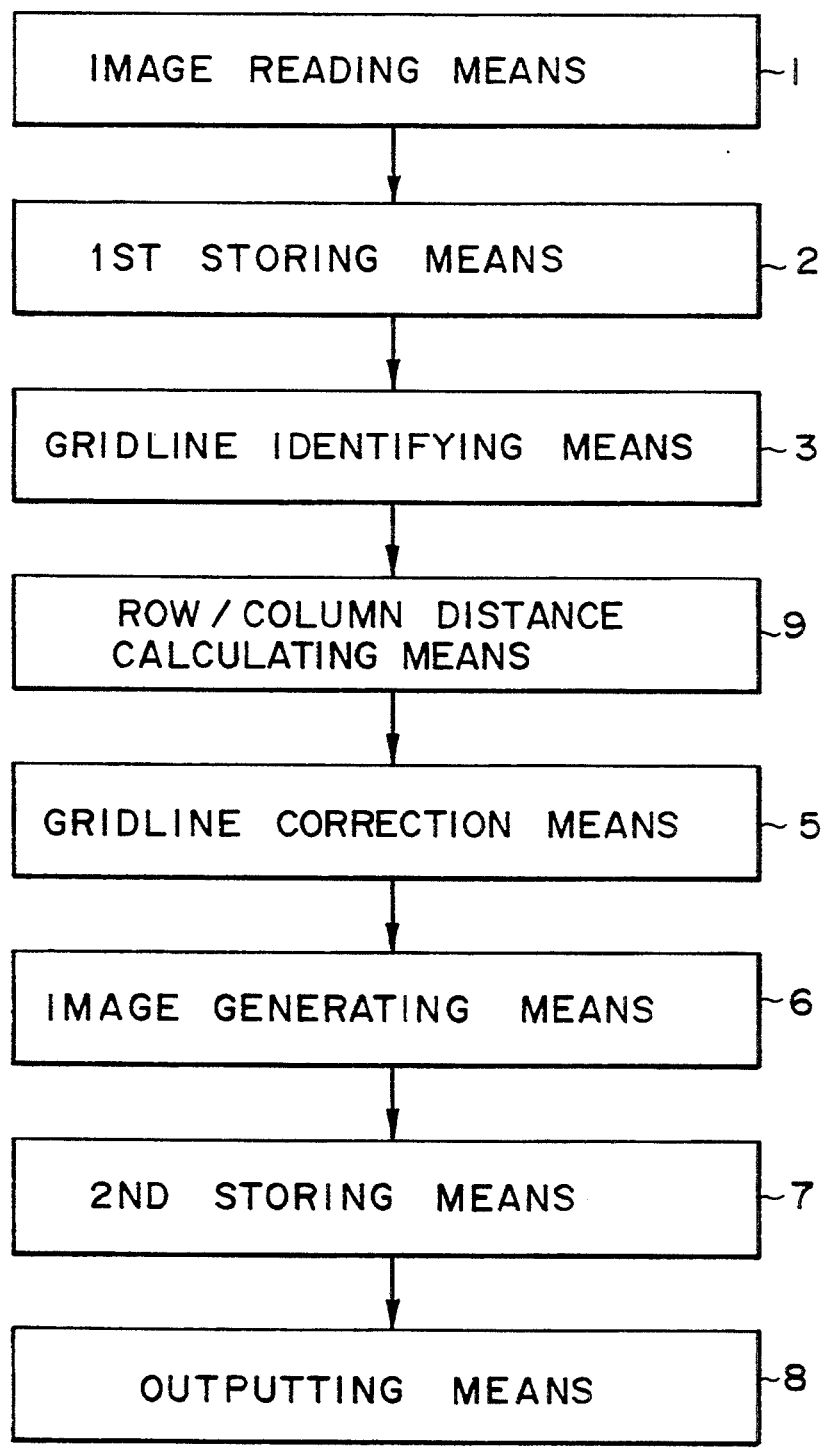
FIG. 9 is a block diagram schematically showing a second embodiment of the present invention.

Referring to FIG. 9, a second embodiment of the image reading and correcting device in accordance with the present invention will be described. As shown, the device includes a row/column distance calculating means 9 different from the means 4 described above. In FIG. 9, the same or similar blocks as or to those shown in FIG. 1 are designated by the same reference numerals, and a detailed description will not be made to avoid redundancy. This is also true with other embodiments to be described.

Figures 10, 11:
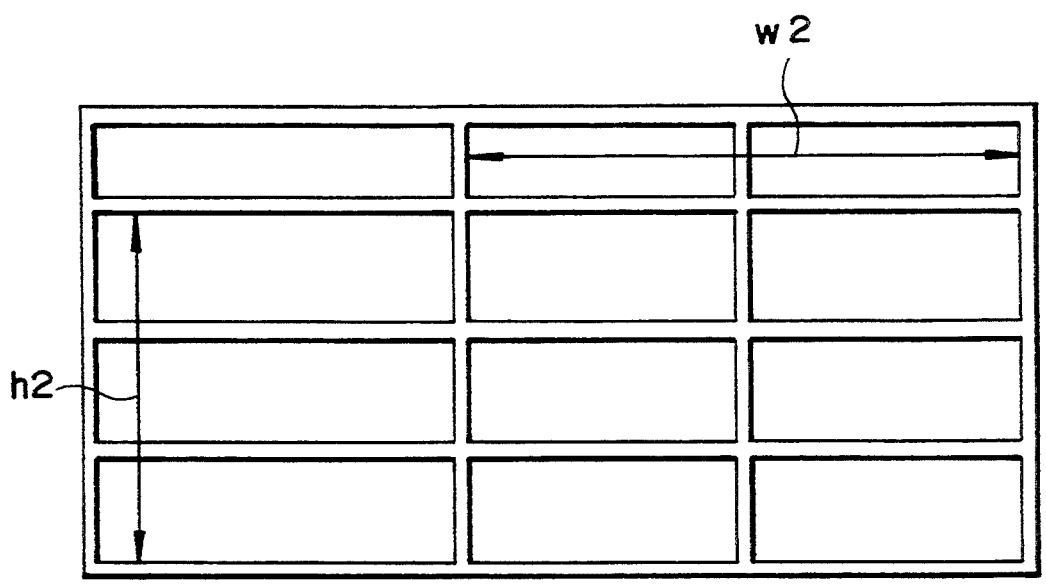
FIG. 10 shows another specific document image including a table.
FIG. 11 shows how row/column distance calculating means calculates distances.

FIG. 10 shows another specific document including a table. The operation of the second embodiment is as follows. The image reading means 1 reads the document image and stores it in the first storing means 2. The gridline identifying means 3 sequentially traces the contours of the image data stored in the storing means 2 to produce contour loops and then separates contour loops constituting the gridlines of the table, as in the first embodiment. Subsequently, as shown in FIG. 11, the row/column distance calculating means 9 calculates the height h2 of the inner contour loops on the leftmost column except for the uppermost leftmost inner contour loop as an add or delete distance in the direction of rows. At the same time, this means 9 calculates the width w2 of the uppermost contour loops except for the leftmost one as an add or delete distance in the direction of columns.

Figure 12:
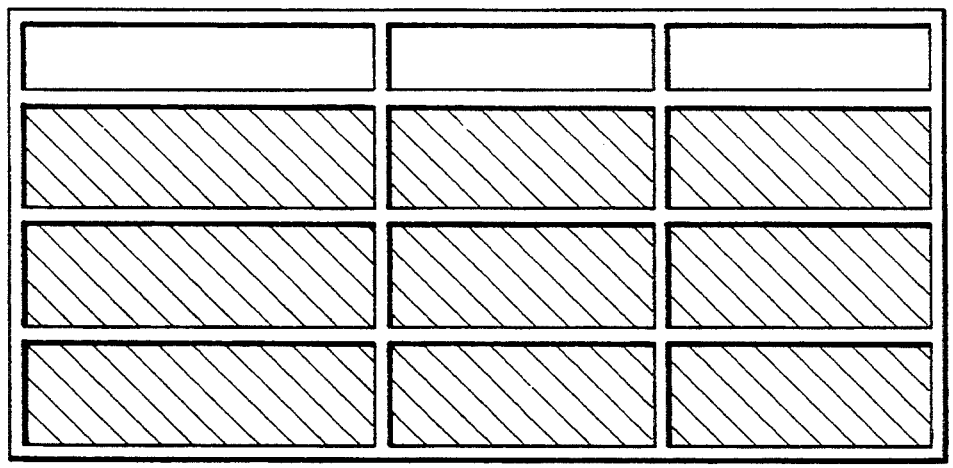
FIG. 12 shows an area to be processed by gridline correcting means in the direction of rows.
Figure 13:
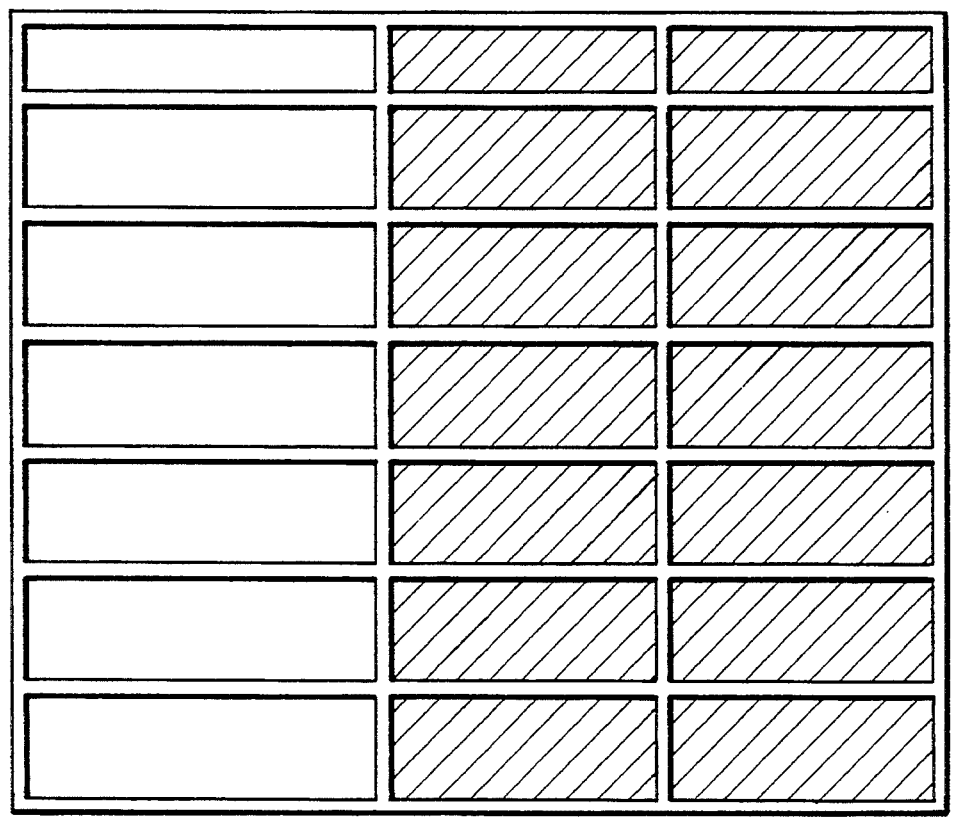
FIG. 13 shows an area to be processed by the gridline correcting means in the direction of columns.

The gridline correcting means 5 calculates an area to be added or deleted in both of the directions of rows and columns on the basis of the add or delete distances determined by the row/column distance calculating means 9. The image generating means 6 generates image data representative of an image having corrected gridlines and stores them in the second storing means 7. FIG. 12 shows an area to be added or deleted in the direction of rows by hatching. In the case of addition, the area shown in FIG. 12 is added to the bottom of the table, as viewed in the figure. Subsequently, as indicated by hatching in FIG. 13, the area of interest in the direction of columns is copied at the right end of the table. FIG. 14 shows the resulting image data stored in the second storing means 7. The outputting means 8 outputs the image data stored in the storing means 7 to reproduce a corresponding image on a paper sheet.

Figure 15:
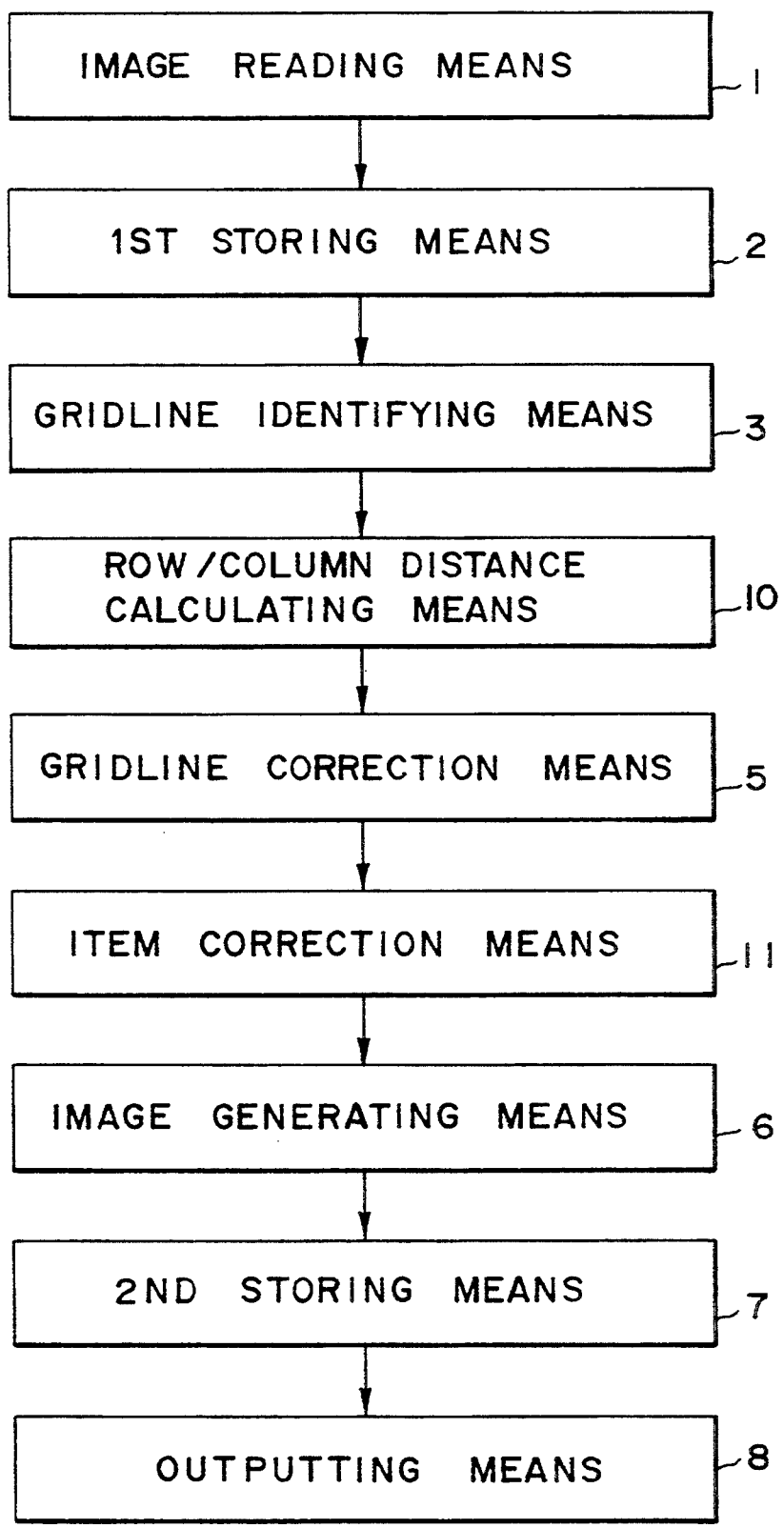
FIG. 15 is a block diagram schematically showing a third embodiment of the present invention.
Figure 17:
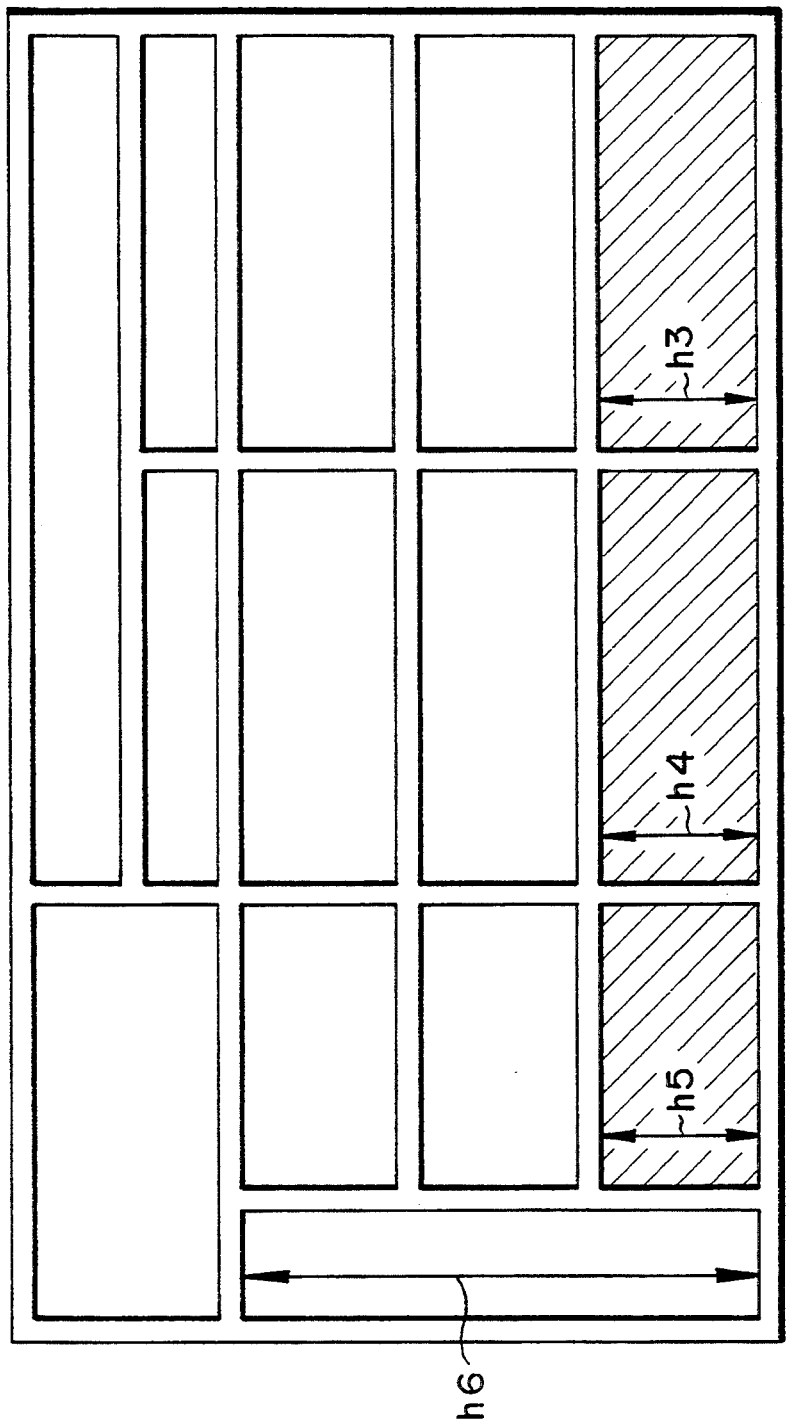
FIG. 17 shows an area to be processed by gridline correcting means in the direction of rows.
Figure 18:
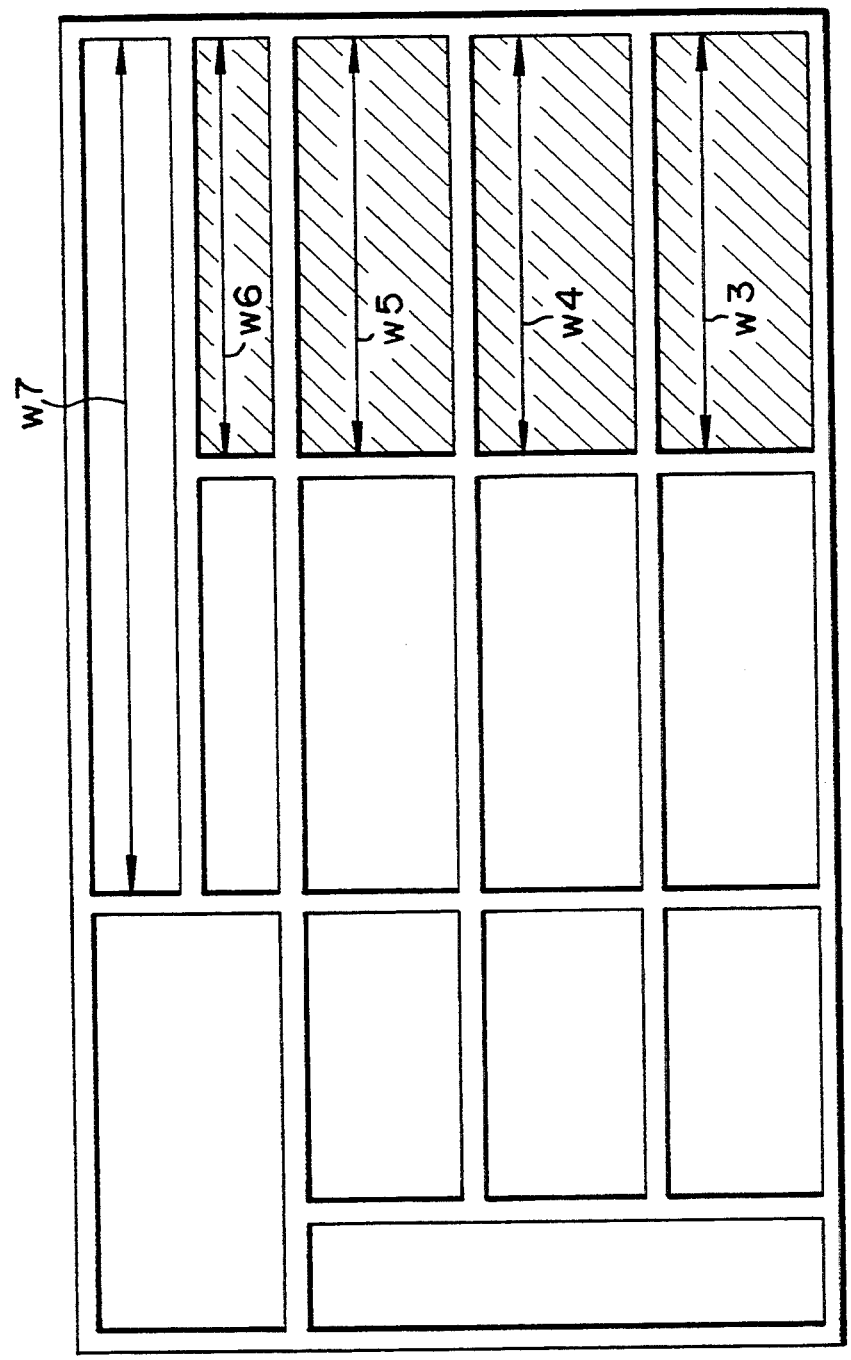
FIG. 18 shows an area to be processed by the gridline correcting means in the direction of columns.

FIG. 15 shows a third embodiment of the image reading and correcting device in accordance with the present invention. As shown, the device includes row/column distance calculating means 10 different from the previous ones, and item correcting means 11. The operation of the this embodiment will be described with reference to FIG. 16 showing another specific document including a table. The image reading means 1, first storing means and gridline identifying means operate in the same manner as in the first embodiment. As shown in FIG. 17, the row/column distance calculating means 10 sequentially examines the heights h3, h4, h5 and h6 of the inner contour loops located at the bottom of the table and determines the height (h3–h5) of the lowermost inner contour loops as an add or delete distance in the direction of rows. At the same time, the calculating means 10 determines the bottom area (meshed in FIG. 17) other than the lowermost inner contour loops to be the area which item correcting means 11 is to process. Subsequently, as shown in FIG. 18, the calculating means 10 sequentially examines the widths w3, w4, w5, w6 and w7 of the rightmost inner contour loops and determines the width (w3–w6) of the narrowest inner contour loops as an add or delete distance in the direction of columns. At the same time, the calculating means 10 determines the rightmost area (meshed in FIG. 18) other than the narrowest inner contour loops to be the area which the item correcting means 11 is to process.

Subsequently, the gridline correcting means 5 calculates an add or delete area in each of the directions of rows and columns on the basis of the add or delete distances determined by the row/column distance calculating means 10. The item correcting means calculates an amount in which the images representative of the items lying in the areas to be corrected should be shifted toward the center of corrected contour loops. The image generating means 6 generates image data with corrected gridlines on the basis of the add or delete area data produced by the gridline correcting means 5 and the shift determined by the item correcting means.

FIG. 19 shows the image data so generated by the image generating means 6 and stored in the second storing means 7.

Figure 20:
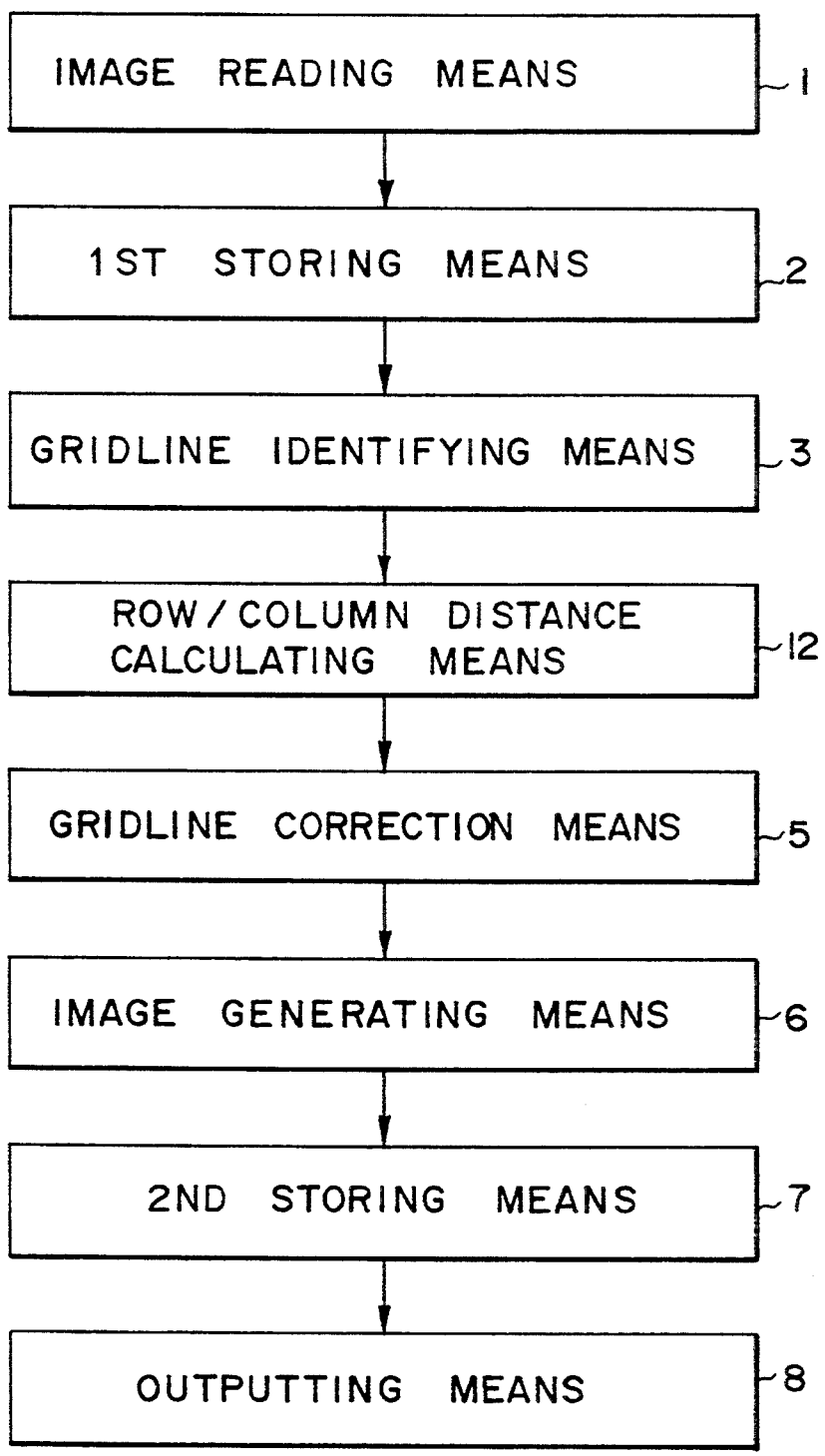
FIG. 20 is a block diagram schematically showing a fourth embodiment of the present invention.
Figure 22:
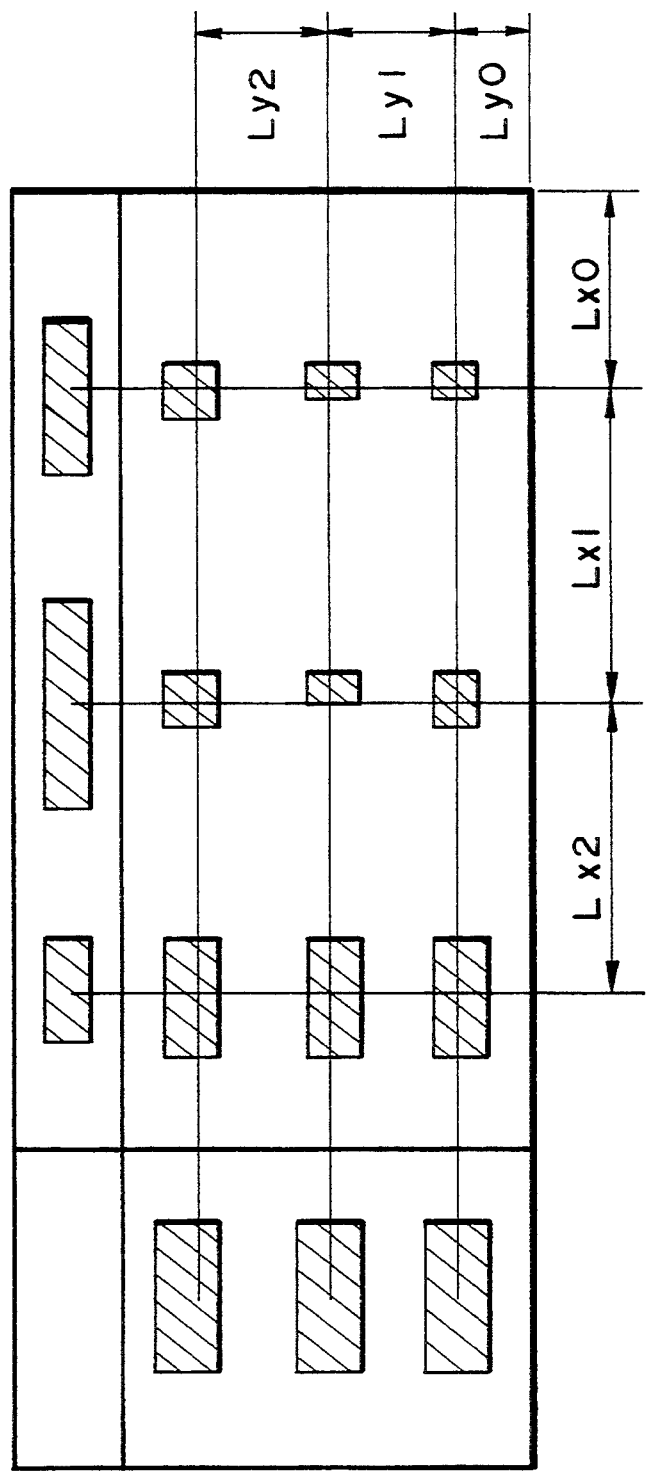
FIG. 22 shows how row/column distance calculating means calculates distances.

FIG. 20 shows a fourth embodiment of the image reading and correcting device in accordance with the present invention. As shown, the device includes row/column distance calculating means 12 different from the previous ones. The operation of this embodiment will be described with reference to FIG. 21 showing another specific document including a table. The reading means 1 reads the document image without rules shown in FIG. 21 and stores the resulting image data in the first storing means 2. The gridline identifying means produces contour loops and then contour loops constituting the gridlines. The row/column distance calculating means 12 produces a histogram of black pixels of each area in the vertical and horizontal directions so as to determine areas where character sequences exist, as shown in FIG. 22. Then, the calculating means 12 determines rows and columns on the basis of the distribution of the center coordinates of such areas. Subsequently, the calculating means 12 produces a mean value of center-to-center distances Lx1 and Lx2 and a mean value of center-to-center distances Ly1 and Ly2, as follows:

$$Lx = \Sigma_m Lxm / m$$

$$Ly = \Sigma_n Lyn / n$$

where m and n designate numbers assigned to the column and the row, respectively. The mean values Lx and Ly are the row distance and the column distance, respectively.

Figure 23:
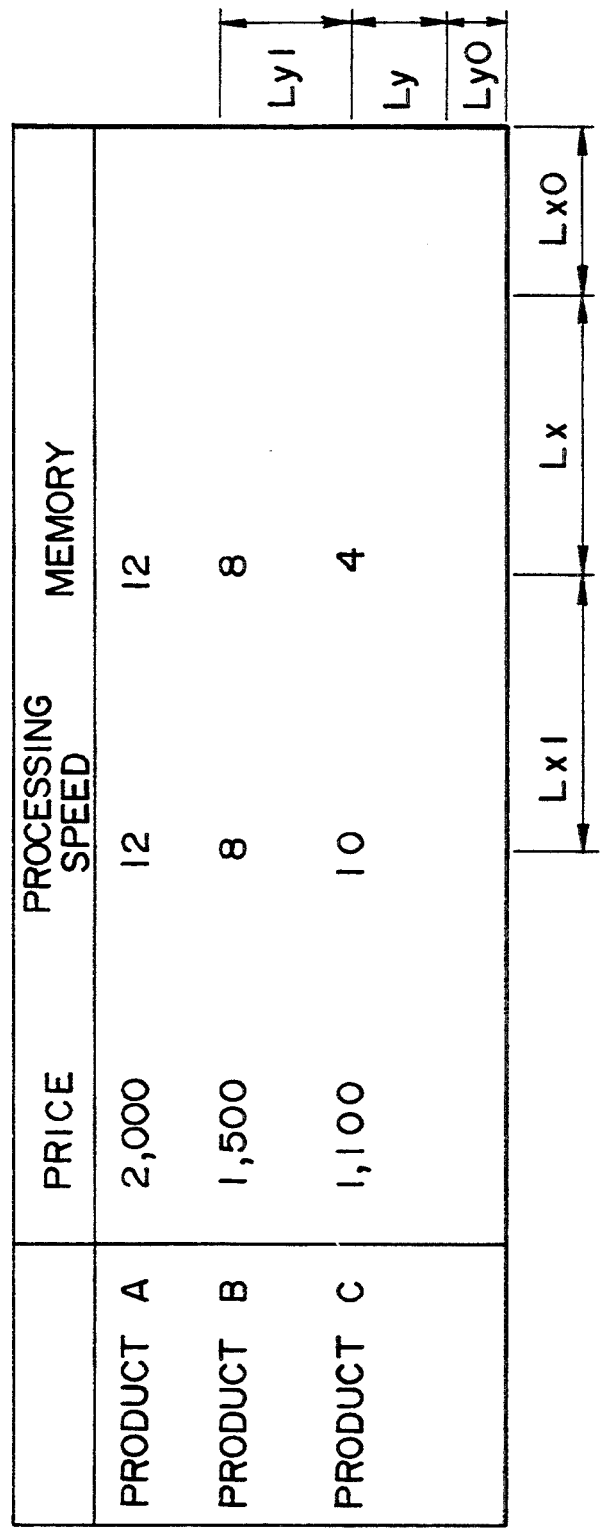
FIG. 23 shows a table image processed by the fourth embodiment.

Subsequently, the gridline correcting means 5 calculates add or delete areas in the directions of rows and columns on the basis of the add or delete distances in the corresponding directions as determined by the row/column distance calculating means 12. The image generating means 6 corrects-the gridlines on the basis of the add or delete area data produced by the gridline correcting means 5 and stores the resulting image data in the second storing means 7. FIG. 23 shows image data stored in the second storing means 7.

Figure 24:
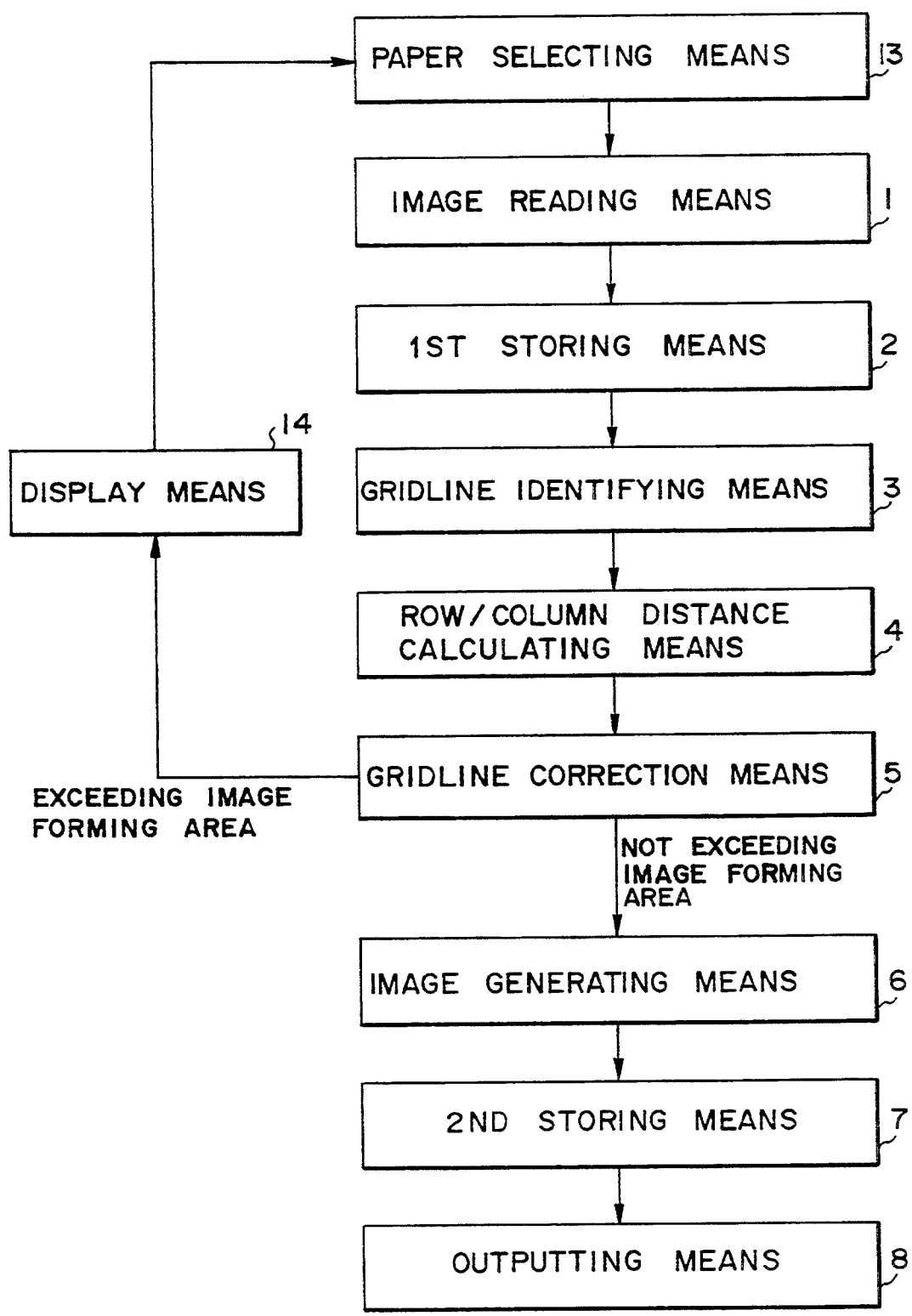
FIGS. 24–26 are block diagrams schematically showing respectively a fifth, a sixth and a seventh embodiment of the present invention.

FIG. 24 shows a fifth embodiment of the image reading and correcting device in accordance with the present invention and applied to a digital copier. As shown, the device has paper selecting means 13 and display means 14. The operator sets a document with a table on a glass platen, not shown, and then enters a desired paper size on paper selecting means 13. Then, the image reading means 1 reads the document and stores the resulting image data in the first storing means 2. The gridline identifying means 3 produces the contour loops of the image data stored in the storing means 2 and then separates contour loops constituting gridlines. The row/column distance calculating means 4 calculates add or delete distances in the directions of rows and columns. The gridline correcting means 5 calculates add or delete areas in the directions of rows and lines on the basis of the add or delete distances. If the size of the corrected table does not exceed the image forming area available with the paper sheet, the image generating means 6 generates an image with corrected gridlines on the basis of the add or delete area data calculated by the gridline correcting means 5 and then stores the image in the second storing means 7. The outputting means 8 outputs the image data stored in the storing means 7 to form a corresponding image on a paper sheet. On the other hand, if the size of the table corrected by the gridline correcting means 5 exceeds the image forming area of the paper sheet, the CPU 204, FIG. 2A, displays an alert message on the display means 14 so as to urge the operator to select another paper size on the paper selecting means 13.

Figure 25:
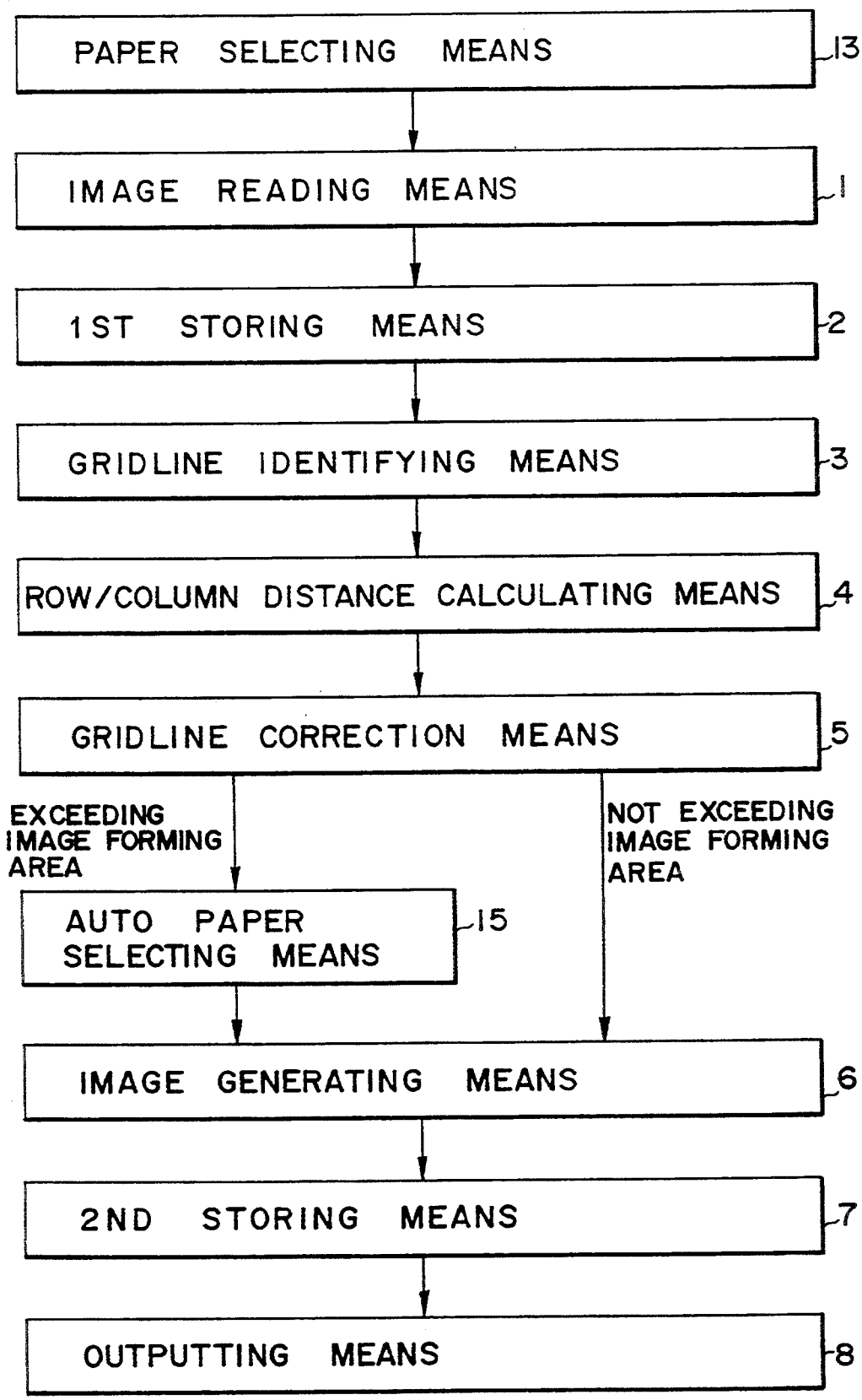

FIG. 25 shows a sixth embodiment of the present invention also applied to a digital copier. As shown, this embodiment includes automatic paper selecting means 15. To begin with, the operator enters a paper size for recording an image on the paper selecting means 13, as in the fifth embodiment. Then, the image reading means reads a document with a table and stores the resulting image data in the first storing means 2. The gridline identifying means 3 produces the contour loops of the image data stored in the storing means 2 and then produces the contour loops constituting gridlines. Subsequently, the row/column distance calculating means 4 calculates an add or delete distance in each of the directions of rows and columns. The gridline correcting means 5 determines an add or delete area in both of the directions of rows and columns.

If the resulting table does not exceed the image forming area of the paper, the image generating means 6 generates an image with corrected gridlines on the basis of the add or delete area data produced by the gridline correcting means 5 and stores it in the second storing means 7. If the size of the table corrected by the gridline correcting means 5 exceeds the image forming area of the paper, the automatic paper selecting means 15 automatically determines a paper size capable of accommodating the corrected table.

Figure 26:
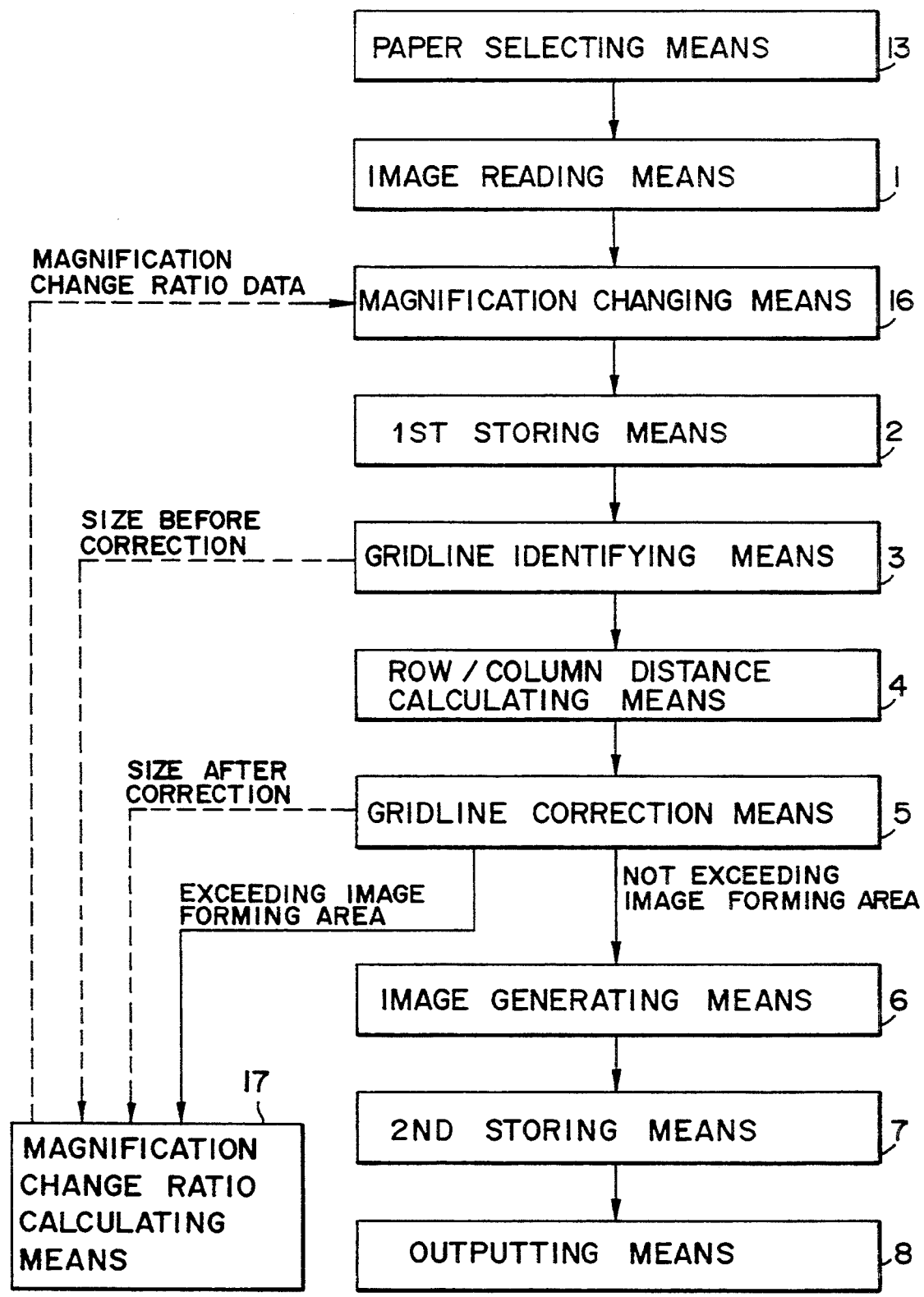

FIG. 26 shows a seventh embodiment of the present invention also applied to a digital copier. As shown, the embodiment includes magnification changing means 16 and magnification change ratio calculating means 17. FIG. 27 shows a specific document on which a table is printed. After the operator has entered a paper size for recording an image on the paper selecting means 13, the image reading means 1 reads the document, as in the fifth embodiment. The magnification changing means 16 changes the magnification at a ratio selected by the operator beforehand and stores the resulting image data in the first storing means 2. The gridline identifying means 3 produces the contour loops of the image data stored in the storing means 2 and then separates the contour loops constituting gridlines. The row/column distance calculating means 4 calculates an add or delete distance in each of the directions of rows and columns. The gridline correcting means 5 determines an add or delete area in each of the directions of rows and columns.

If the resulting table does not exceed the image forming area of the paper sheet, the image generating means 6 generates an image with corrected gridlines and stores it in the second storing means 7. Assume that the table with the corrected gridlines exceeds the image forming area of the paper sheet, as shown in FIG. 28 specifically. Then, the magnification change ratio calculating means 17 produces a magnification change ratio R, as follows:

$$R = R1 \times min(Lx1/Lx2, Ly1/Ly2)$$

where R1 is the magnification change ratio entered first, Lx1 and Ly1 are respectively the width and the height of the table before correction, and Lx2 and Ly2 are respectively the width and the height of the table after correction. Based on the magnification change ratio R, the magnification changing means 16 automatically sets the magnification change ratio. As a result, as shown in FIG. 29, an output image with a table having the width and height before correction is produced by the next processing cycle.

Figure 30:
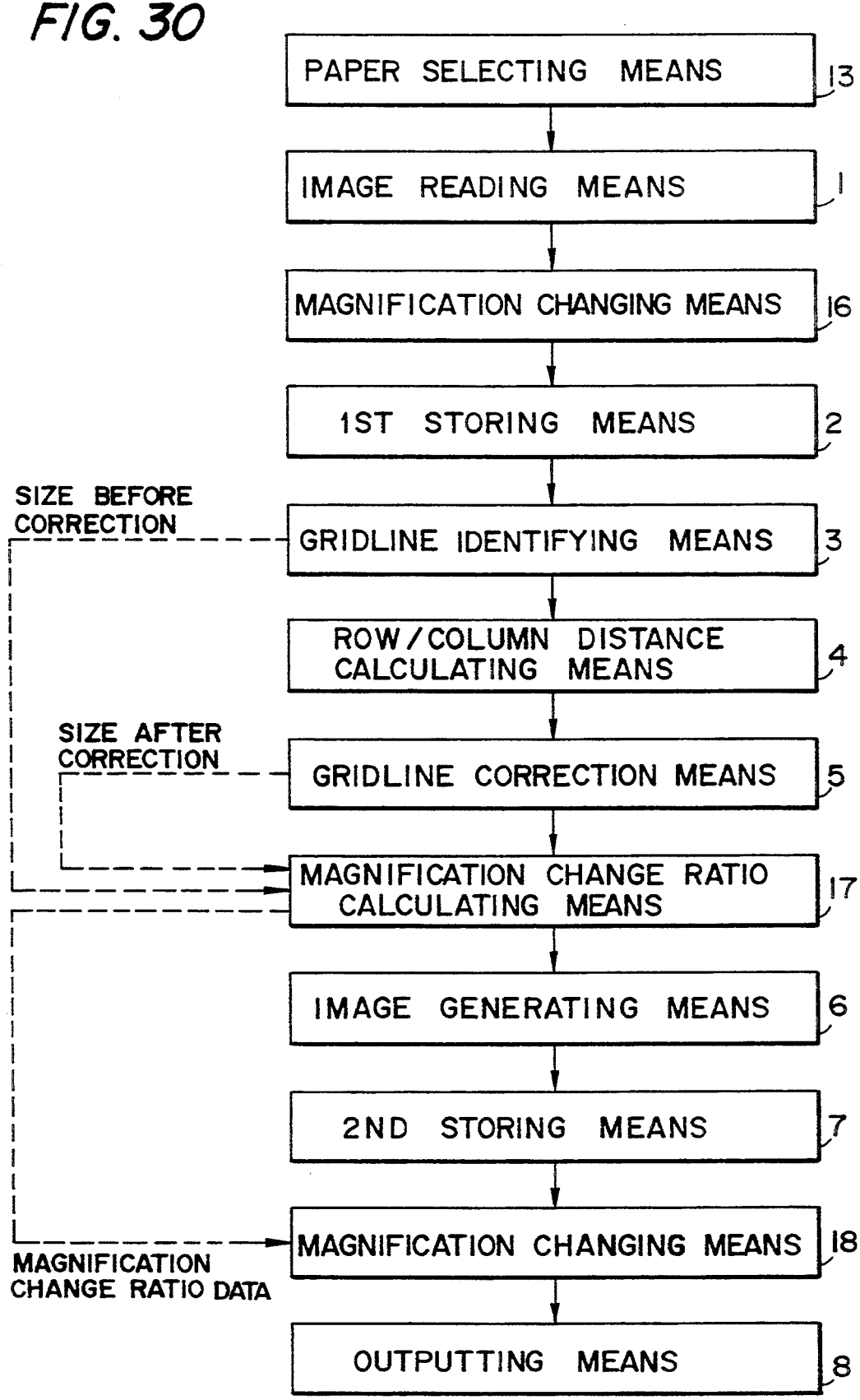

FIG. 30 shows an eighth embodiment of the present invention also applied to a digital copier. As shown, the embodiment includes magnification changing means 18 in addition to the magnification changing means 16. After the operator has entered a paper size for recording an image on the paper selecting means 13, the image reading means 1 reads a document with a table. The magnification changing means 16 changes the magnification of the resulting image data at a ratio selected by the operator beforehand and stores the resulting image data in the first storing means 2. The gridline identifying means 3 produces the contour loops of the image data stored in the storing means 2 and then separates the contour loops constituting gridlines. The row/column distance calculating means 4 calculates an add or delete distance in each of the direction of rows and columns.

The gridline correcting means 5 determines an add or delete area in each of the directions of rows and columns. The magnification change ratio calculating means 17 determines a magnification change ratio R on the basis of the table size before correction and the table size after correction, as in the seventh embodiment. Here, when the size of the corrected table exceeds the image forming area of the paper sheet, a 100% magnification change ratio is set without exception. The image generating means 6 generates image data representative of the image having corrected gridlines and stores them in the second storing means 7. The magnification changing means 18 reads the image data out of the storing means 7, changes the magnification on the basis of the magnification change ratio data from the magnification change ratio calculating means 17, and then sends the resulting image data to the outputting means 8. In this manner, even when the size of the corrected table exceeds the image forming area available with the paper sheet, the embodiment can output image data representative of an image of adequate size by a single processing cycle.

Figure 31:
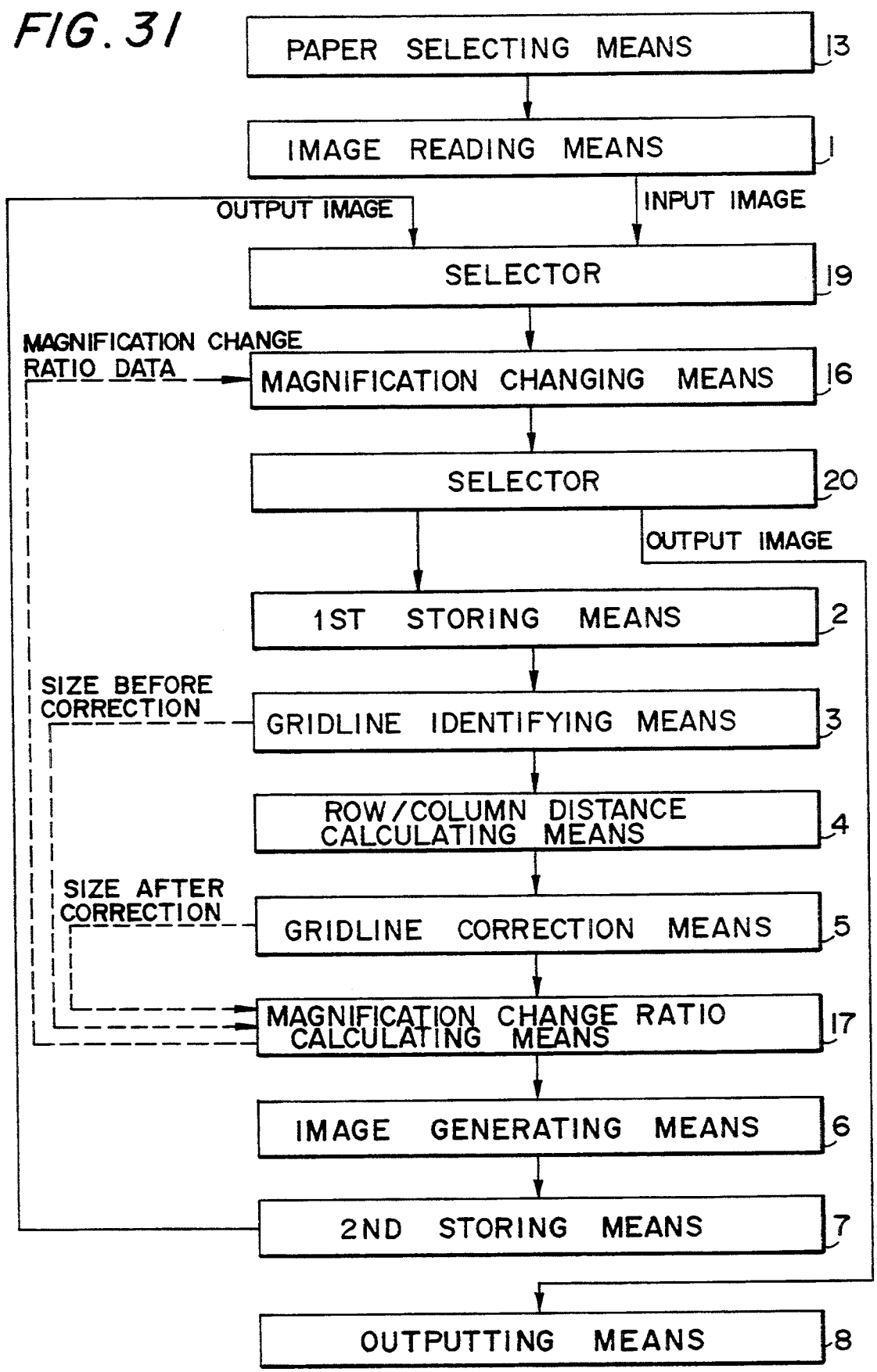

FIG. 31 shows a ninth embodiment of the present invention also applied to a digital copier. As shown, the embodiment includes a first selector 19 and a second selector 20. After the operator has entered a paper size for recording an image on the paper selecting means 13, the image reading means 1 reads a document on which a table is printed and delivers the resulting image data to the magnification changing means 16 via the selector 19. The magnification changing means 16 changes the magnification at a predetermined magnification change ratio and then stores the resulting image data in the first storing means 2 via the selector 20. After the gridline identifying means 3 has separated contour loops, the row/column distance calculating means calculates an add or delete distance in both of the directions of rows and columns.

The gridline correcting means 5 calculates an add or delete area in both of the directions of rows and columns while the magnification change ratio calculating means 17 determines a magnification change ratio R. Again, when the size of the corrected table exceeds the image forming area of the paper sheet, a 100% magnification change ratio is set without exception. The image generating means 6 stores image data representative of an image having corrected gridlines in the second storing means 7. The image data are read out of the storing means 7 and applied to the magnification changing means 16 via the selector 19. The magnification changing means 16 changes the magnification of the image data on the basis of the magnification change ratio data from the calculating means 17 and then delivers the resulting image data to the outputting means 8 via the selector 20. In this manner, even when the size of the corrected table exceeds the image forming area of the paper, the embodiment can output image data representative of an image of adequate size by a single processing cycle. In addition, single magnification changing means suffices due to the switchover of the image signals performed by the two selectors 19 and 20, reducing the cost of the apparatus. The selectors 19 and 20 are automatically switched by the CPU 204, FIG. 2A.

Figure 32:
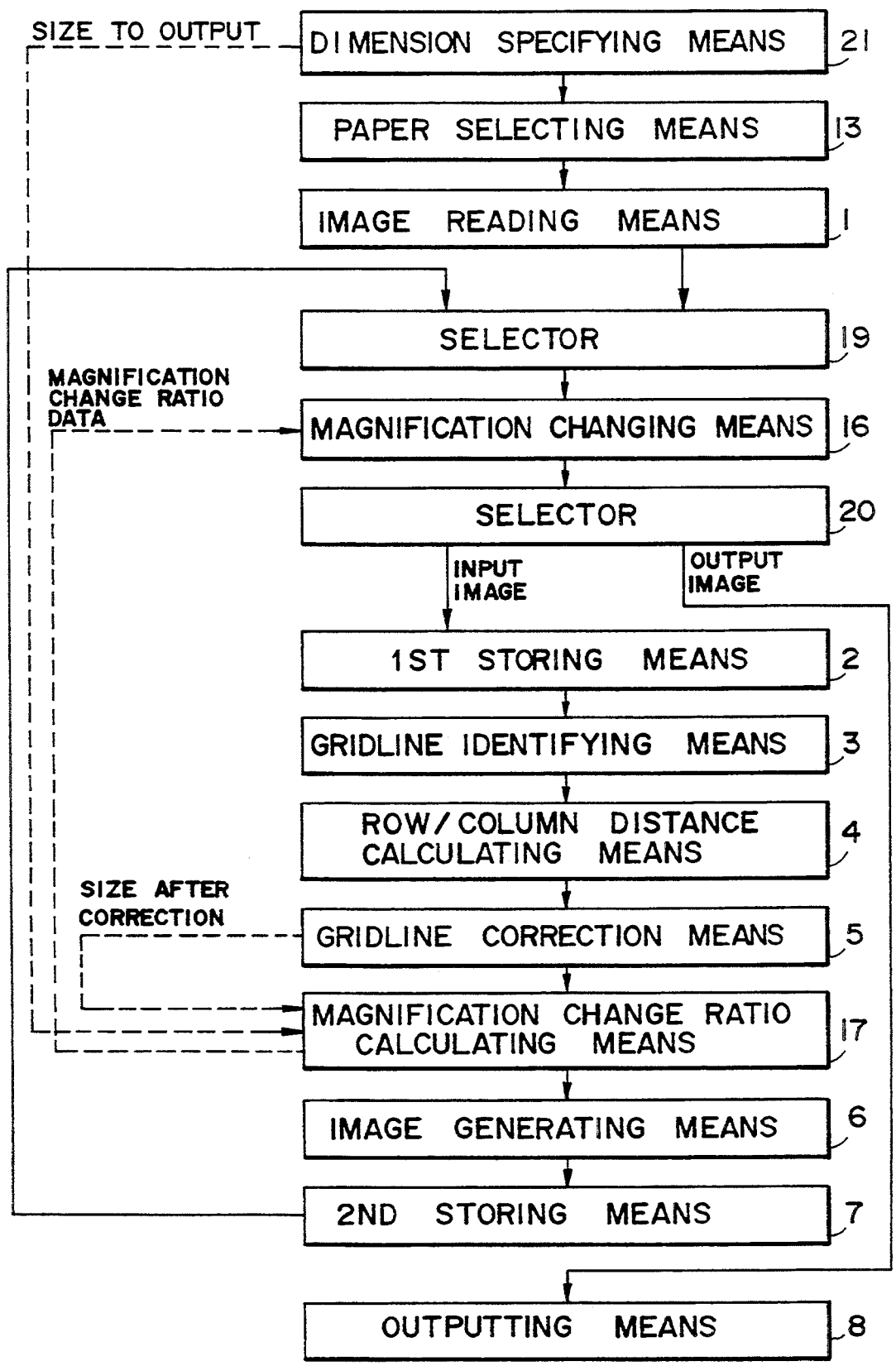
Figure 33:
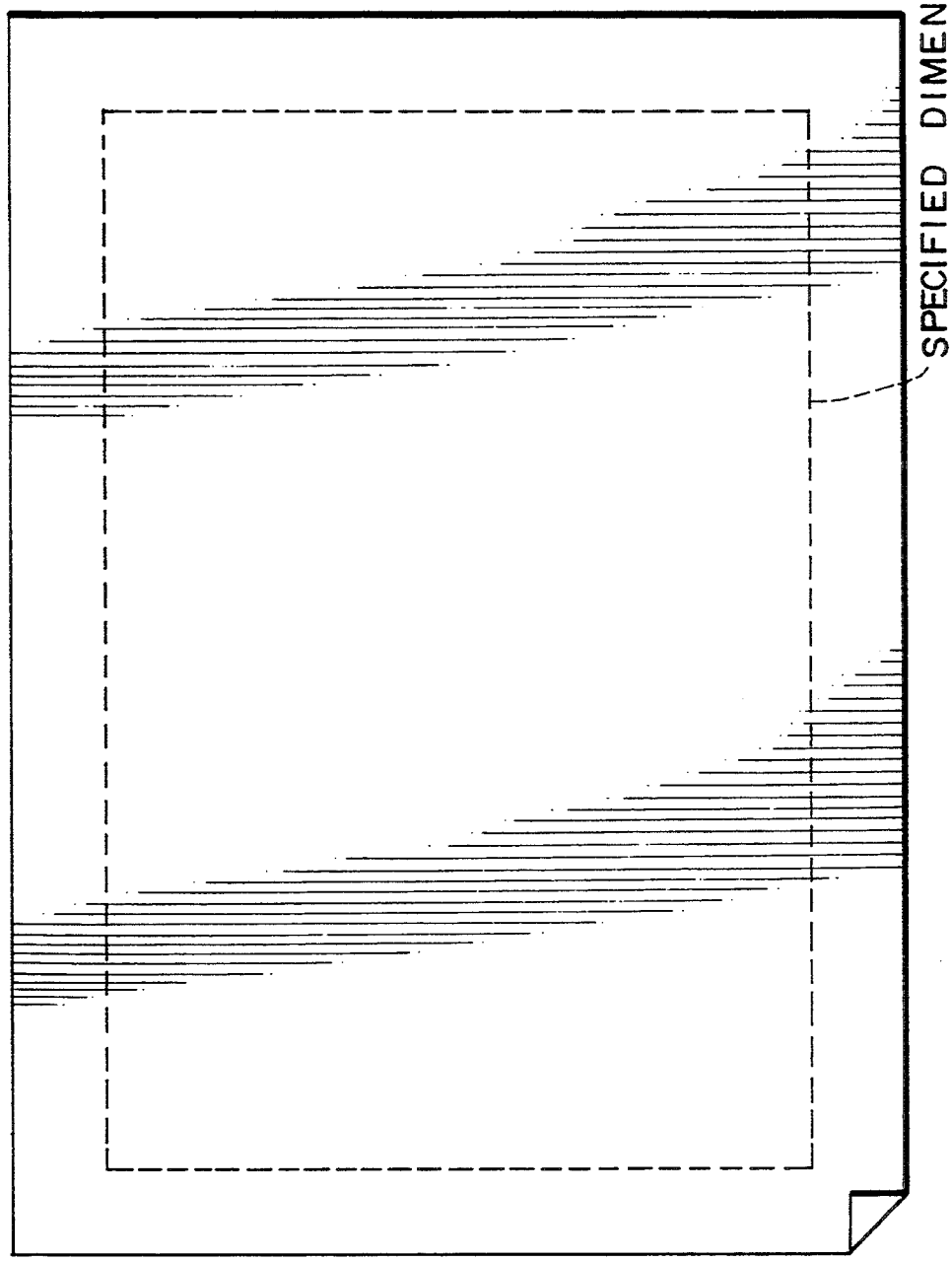
FIG. 33 shows an area specified by dimension specifying means.

FIG. 32 shows a tenth embodiment of the present invention also applied to a digital copier. As shown, the embodiment includes dimension specifying means 21. As shown in FIG. 33, the operator specifies the size of a table to be recorded on the dimension specifying means 21 and then enters a paper size on the paper selecting means 13. Thereafter, the image reading means 1 reads, for example, the specific document shown in FIG. 27 and delivers the resulting image data to the magnification changing means 16 via the selector 19. The magnification changing means 16 changes the magnification of the image data at a predetermined magnification change ratio and then stores the resulting image data in the first storing means 2 via the selector 20. The gridline identifying means 3 separates contour loops while the row/column distance calculating means calculates an add or delete distance in both of the directions of rows and columns.

The gridline correcting means 5 calculates an add or delete area in both of the directions of rows and columns. The magnification change ratio calculating means 17 determines, based on the table size entered on the dimension specifying means 21 and the table size after correction, magnification change ratios Rx and Ry in the horizontal and vertical directions, respectively, as follows:

$$Rx = Lx2 / Lxi$$

$$Ry = Ly2 / Lyi$$

where $Lxi$ and $Lyi$ are respectively the dimensions in the horizontal and vertical directions entered on the dimension specifying means 21. The image generating means 6 generates image data representative of the image corrected by the gridline correcting means 5 and stores them in the second storing means 7. These image data are read out and transferred to the magnification changing means 16 via the selector 19. The magnification changing means 16 changes the magnification of the image data on the basis of the magnification change data from the calculating means 17 and then sends the resulting image data to the outputting means 8 via the selector 20. FIG. 34 shows an image undergone such image processing and outputted by the outputting means 8. In this manner, the embodiment is capable of changing the size of a corrected table to the size specified beforehand before outputting the table.

Figure 35:
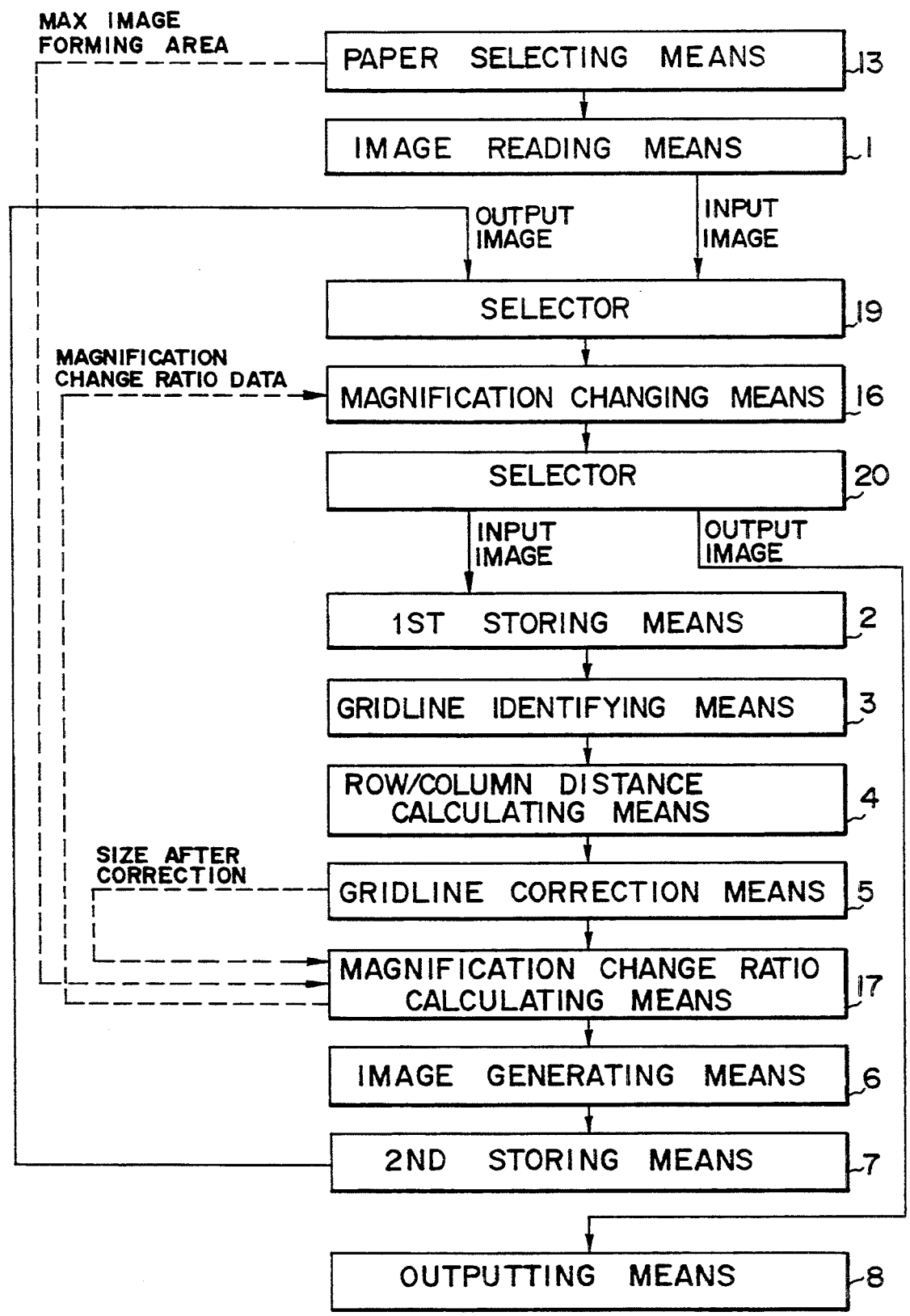
FIG. 35 is a block diagram schematically showing an eleventh embodiment of the present invention.

FIG. 35 shows an eleventh embodiment of the present invention also applied to a digital copier. In this embodiment, after the operator has specified a paper size on the paper selecting means 13, the image reading means 1 reads, for example, the specific document shown in FIG. 27 and sends the resulting image data to the magnification changing means 16 via the selector 19. In response, the magnification changing means 16 changes the magnification of the image data at a predetermined magnification change ratio and stores the resulting image data in the first storing means 2 via the selector 20. The gridline identifying means 3 separates contour loops while the row/column distance calculating means 4 calculates an add or delete distance in both of the directions of rows and columns.

Figure 36:
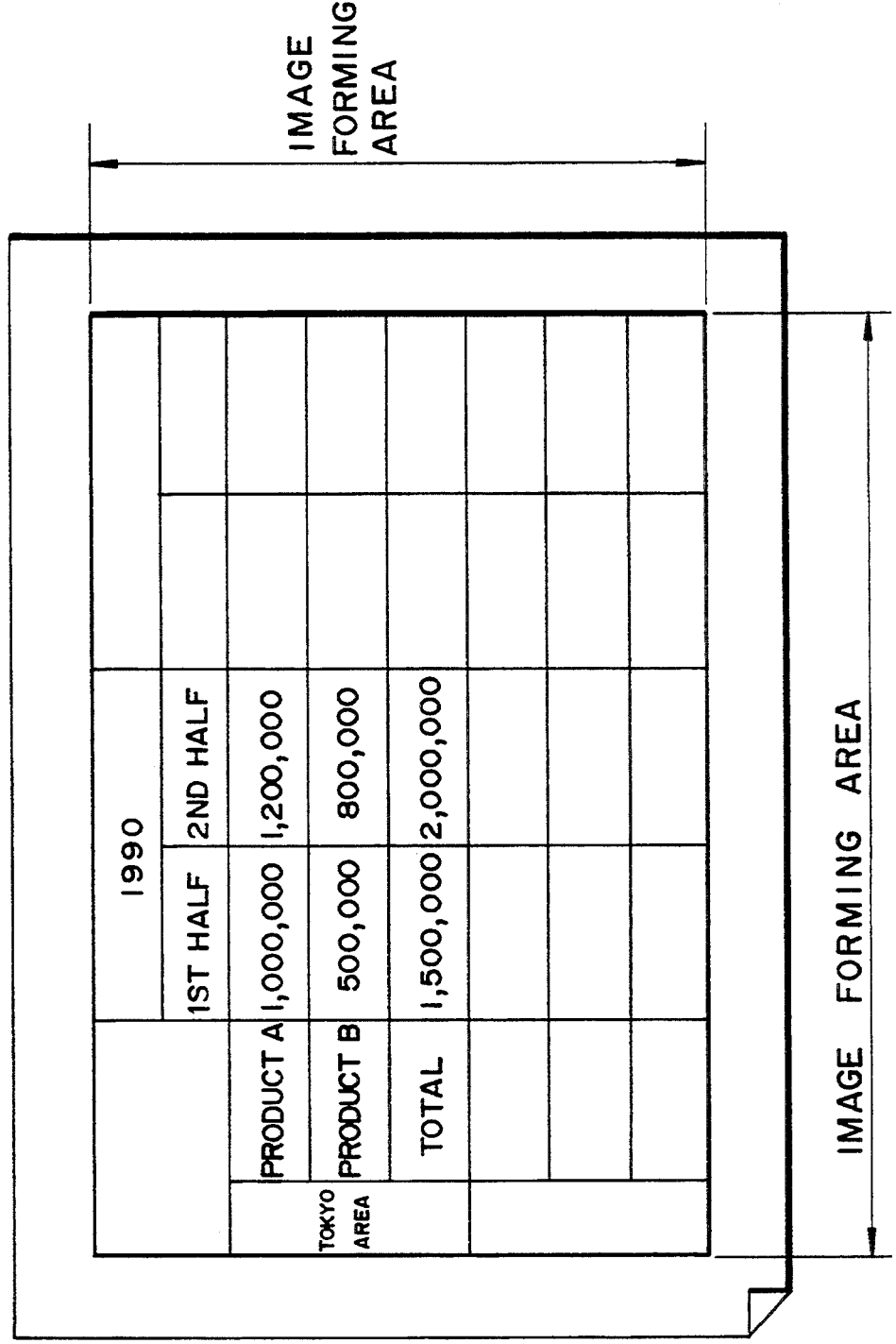
FIG. 36 shows a table image processed by the eleventh embodiment.

The gridline correcting means 5 calculates an add or delete area in both of the directions of rows and lines. The magnification change ratio calculating means 17 calculates, based on the maximum image forming area available with the paper sheet selected on the paper selecting means 13 and the table size after correction, magnification change ratios Rx and Ry in the horizontal and vertical directions, respectively, as follows:

$$Rx = Lx2 / Lxp$$

$$Ry = Ly2 / Lyp$$

where Lxp and Lyp are respectively the dimensions of the maximum image forming area of the paper in the horizontal and vertical directions. If desired, the independent magnification ratios Rx and Ry in the horizontal and vertical directions, respectively, may be replaced with smaller one of the ratios Rx and Ry. This is also successful in outputting the table without disturbing the images forming the items of the table. The image generating means 6 generates an image representative of the corrected table on the basis of the add or delete area data from the gridline correcting means 5 and then stores it in the second storing means 7. The data are read out of the storing means 7 and transferred to the magnification changing means 16 via the selector 19. The magnification changing means 16 changes the magnification of the image data on the basis of the magnification change ratio data from the calculating means 17 and delivers the resulting image data to the outputting means 8 via the selector 20. As a result, the image data modifies a laser, not shown, to record the image on the paper sheet. FIG. 36 shows an image undergone such image processing and outputted by the output means 8. In this manner, even when the size of the corrected table exceeds the maximum image forming area of the paper sheet, the embodiment can change the table size to the size of the maximum image forming area.

In summary, an image forming apparatus having an image reading and correcting device in accordance with the present invention achieves various unprecedented advantages, as follows. Rows and columns can be added to or deleted from a table on a group basis. The rows and columns of a table can be added or deleted except for a title portion included in the table. Not only the lowermost row or the rightmost column of a table can be added or deleted, but also an item extending over a plurality of rows or columns can be corrected. Rows or columns can be added or deleted even with a table void of gridlines. A defective image is prevented from being recorded on a paper sheet by accident, and a paper size is automatically changed to make the subsequent operation smooth. Even when paper sheets of large size are not available, a complete image with a corrected table can be formed by the subsequent image forming operation. Moreover, such a complete image is achievable with a single image forming operation. Single magnification changing means allows the size of an output image to be changed, reducing the cost of the apparatus. An image of desired size can be produced with no regard to the size of a corrected table. In addition, an image of maximum size available with a selected paper size can be produced.

Various modifications will become possible for those skilled in the art after receiving the teachings of the present disclosure without departing from the scope thereof.

What is claimed is:

1. An image reading and correcting device comprising:
   image reading means for optically reading a document to convert said document to bilevel image data by photoelectric conversion;
   first storing means for storing the image data from said image reading means;
   second storing means for storing image data produced by processing the image data stored in said first storing means;
   outputting means for outputting the image data stored in said second storing means;
   gridline identifying means for identifying an image representative of gridlines of a table out of the image data stored in said first storing means;
   row/column distance calculating means for calculating a height of, among rectangular cells constituting the table, a lowermost leftmost rectangular cell and a width of an uppermost rightmost rectangular cell as, respectively, a row distance and a column distance to be added or deleted;
   gridline correcting means for producing area data to be added or deleted on the basis of said row distance and said column distance; and
   image generating means for generating an image with corrected gridlines by correcting the gridlines of the image data on the basis of said area data.

2. A device as claimed in claim 1, wherein said row/column distance calculating means calculates a height of the rectangular cells on all rows except for an uppermost row as said row distance, and calculates a width of the rectangular cells on all columns except for a leftmost column as said column distance.

3. A device as claimed in claim 1, wherein said row/column distance calculating means calculates a height and a width of lowermost rightmost one of the rectangular cells as said row distance and said column distance, respectively;
   said gridline correcting means producing, based on said row distance and said column distance, data representative of an area to be added or deleted or to be enlarged or reduced;
   said device further comprising item correcting means for enlarging, reducing or moving an image existing in an area enlarged or reduced by said gridline correcting means.

4. A device as claimed in claim 1, wherein said row/column distance calculating means separates images representative of character sequences and calculates said row distance and said column distance on the basis of a positional relation between said images.

5. An image forming apparatus having an image reading and correcting device comprising image reading means for optically reading a document to convert said document to bilevel image data by photoelectric conversion, first storing means for storing the image data from said image reading means, second storing means for storing image data produced by processing the image data stored in said first storing means, outputting means for outputting the image data stored in said second storing means, gridline identifying means for identifying an image representative of gridlines of a table out of the image data stored in said first storing means, row/column distance calculating means for calculating a height of, among rectangular cells constituting the table, a lowermost leftmost rectangular cell and a width of an uppermost rightmost rectangular cell as, respectively, a row distance and a column distance to be added or deleted, gridline correcting means for producing area data to be added or deleted on the basis of said row distance and said column distance, and image generating means for generating an image with corrected gridlines by correcting the gridlines of the image data on the basis of said area data;

said apparatus comprising:
paper selecting means for allowing an operator to select a desired paper size;
displaying means for displaying a message;
image forming means for forming an image on a recording medium implemented as a paper sheet in response to an image signal; and
control means for controlling said paper selecting means, said displaying means, and said image forming means;
said control means displaying an alert message on said displaying means when a table corrected on the basis of said area data from said gridline correcting means will exceed an image forming area of the paper sheet of the size selected on said paper selecting means.

6. An apparatus as claimed in claim 5, wherein said row/column distance calculating means calculates a height of the rectangular cells on all rows except for an uppermost row as said row distance, and calculates a width of the rectangular cells on all columns except for a leftmost column as said column distance.

7. An apparatus as claimed in claim 5, wherein said row/column distance calculating means calculates a height and a width of lowermost rightmost one of the rectangular cells as said row distance and said column distance, respectively;
said gridline correcting means producing, based on said row distance and said column distance, data representative of an area to be added or deleted or to be enlarged or reduced;
said apparatus further comprising item correcting means for enlarging, reducing or moving an image existing in an area enlarged or reduced by said gridline correcting means.

8. An apparatus as claimed in claim 5, wherein said row/column distance calculating means separates images representative of character sequences and calculates said row distance and said column distance on the basis of a positional relation between said images.

9. An image forming apparatus having an image reading and correcting device comprising image reading means for optically reading a document to convert said document to bilevel image data by photoelectric conversion, first storing means for storing the image data from said image reading means, second storing means for storing image data produced by processing the image data stored in said first storing means, outputting means for outputting the image data stored in said second storing means, gridline identifying means for identifying an image representative of gridlines of a table out of the image data stored in said first storing means, row/column distance calculating means for calculating a height of, among rectangular cells constituting the table, a lowermost leftmost rectangular cell and a width of an uppermost rightmost rectangular cell as, respectively, a row distance and a column distance to be added or deleted, gridline correcting means for producing area data to be added or deleted on the basis of said row distance and said column distance, and image generating means for generating an image with corrected gridlines by correcting the gridlines of the image data on the basis of said area data;

said apparatus comprising:
automatic paper selecting means for automatically selecting a paper size in response to size selection data;
image forming means for forming an image on a recording medium implemented as a paper sheet in response to an image signal; and
control means for controlling said automatic paper selecting means and said image forming means;
said control means selecting, when a table corrected on the basis of said area data from said gridline correcting means will exceed an image forming area of a paper sheet selected, adequate one of paper sheets each having a particular size and sending resulting size selection data to said automatic paper selecting means.

10. An apparatus as claimed in claim 9, wherein said row/column distance calculating means calculates a height of the rectangular cells on all rows except for an uppermost row as said row distance, and calculates a width of the rectangular cells on all columns except for a leftmost column as said column distance.

11. An apparatus as claimed in claim 9, wherein said row/column distance calculating means calculates a height and a width of lowermost rightmost one of the rectangular cells as said row distance and said column distance, respectively;
said gridline correcting means producing, based on said row distance and said column distance, data representative of an area to be added or deleted or to be enlarged or reduced;
said apparatus further comprising item correcting means for enlarging, reducing or moving an image existing in an area enlarged or reduced by said gridline correcting means.

12. An apparatus as claimed in claim 9, wherein said row/column distance calculating means separates images representative of character sequences and calculates said row distance and said column distance on the basis of a positional relation between said images.

13. An image forming apparatus having an image reading and correcting device comprising image reading means for optically reading a document to convert said document to bilevel image data by photoelectric conversion, first storing means for storing the image data from said image reading means, second storing means for storing image data produced by processing the image data stored in said first storing means, outputting means for outputting the image data stored in said second storing means, gridline identifying means for identifying an image representative of gridlines of a table out of the image data stored in said first storing means, row/column distance calculating means for calculating a height of, among rectangular cells constituting the table, a lowermost leftmost rectangular cell and a width of an uppermost rightmost rectangular cell as, respectively, a row distance and a column distance to be added or deleted, gridline correcting means for producing area data to be added or deleted on the basis of said row distance and said column distance, and image generating means for generating an image with corrected gridlines by correcting the gridlines of the image data on the basis of said area data;

said apparatus comprising:
image forming means for forming an image on a recording medium implemented as a paper sheet in response to an image signal;
first magnification changing means for generating image data by changing a size of the bilevel image data produced by said image reading means and storing said image data in said first storing means; and
magnification change ratio calculating means for determining, when a table corrected on the basis of said area data from said gridline correcting means will exceed an image forming area of a paper sheet selected, a magnification change ratio of said table corrected to equalize said table to the table of the document in size and then delivering magnification change ratio data.

14. An apparatus as claimed in claim 13, wherein said row/column distance calculating means calculates a height of the rectangular cells on all rows except for an uppermost row as said row distance, and calculates a width of the rectangular cells on all columns except for a leftmost column as said column distance.

15. An apparatus as claimed in claim 13, wherein said row/column distance calculating means calculates a height and a width of lowermost rightmost one of the rectangular cells as said row distance and said column distance, respectively;
said gridline correcting means producing, based on said row distance and said column distance, data representative of an area to be added or deleted or to be enlarged or reduced;
said apparatus further comprising item correcting means for enlarging, reducing or moving an image existing in an area enlarged or reduced by said gridline correcting means.

16. An apparatus as claimed in claim 13, wherein said row/column distance calculating means separates images representative of character sequences and calculates said row distance and said column distance on the basis of a positional relation between said images.

17. An apparatus as claimed in claim 13, further comprising second magnification changing means for changing a size of the image data stored in said second storing means in response to said magnification change ratio data from said magnification change ratio calculating means, and sending resulting image data to said outputting means.

18. An apparatus as claimed in claim 13, further comprising:
first signal selecting means for selectively applying the image data from said image reading means or the image data from said second storing means to said first magnification changing means; and
second signal selecting means for selectively applying the image data from said first magnification changing means to either one of said first storing means and said outputting means.

19. An apparatus as claimed in claim 13, further comprising table size specifying means for allowing the operator to specify a size of a table to be formed;
said magnification change ratio calculating means determining a magnification change ratio on the basis of a size of a table corrected on the basis of the area data from said gridline correcting means and data representative of the size entered on said table size specifying means.

20. An apparatus as claimed in claim 13, wherein said magnification change ratio calculating means determines a magnification change ratio on the basis of a size of a table corrected on the basis of the area data from said gridline correcting means and data representative of a maximum image forming area available with a paper sheet selected.

21. An image reading and correcting device comprising:
image reading means for optically reading a document and converting said document into bilevel image data using photoelectric conversion;
first storing means for storing the image data converted by said image reading means;
gridline identifying means for identifying gridlines of a table from the image data stored in said first storing means, said table including a plurality of boxes;
row/column distance calculating means for calculating a smallest height of said plurality of boxes and a smallest width of said plurality of boxes;
gridline correcting means for producing area data representing at least one box having a height equal to said smallest height and having a width equal to said smallest width, said gridline correcting means automatically correcting said table by adding and deleting said area data from said table;
image generating means for generating an image corrected by said gridline correcting means;
second storing means for storing said image corrected by said gridline correcting means; and
outputting means for outputting said image data stored in said second storing means.

22. An image reading and correcting device comprising:
image reading means for optically reading a document and converting said document into bilevel image data using photoelectric conversion;
first storing means for storing the image data converted by said image reading means;
gridline identifying means for identifying gridlines of a table from the image data stored in said first storing means, said table including a plurality of boxes;
row/column distance calculating means for generating a histogram of black pixels where character sequences exist in each said plurality of boxes, and for generating a mean center-to-center value obtained for heights and widths between each group of black pixels for each said plurality of boxes;
gridline correcting means for producing area data representing at least one box having a mean center-to-center height generated by said row/column distance calculating means and having a mean center-to-center width generated by said row/column distance calculating means, and for automatically correcting said table by adding and deleting said area data from said table;
image generating means for generating an image corrected by said gridline correcting means;
second storing means for storing said image corrected by said gridline correcting means; and
outputting means for outputting said image data stored in said second storing means.

* * * * *